United States Patent
Tang

(10) Patent No.: US 10,356,315 B2
(45) Date of Patent: *Jul. 16, 2019

(54) IMAGE PROCESSING METHOD AND APPARATUS, AND ELECTRONIC DEVICE

(71) Applicant: GUANGDONG OPPO MOBILE TELECOMMUNICATIONS CORP., LTD., Dongguan (CN)

(72) Inventor: Cheng Tang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 62 days.

This patent is subject to a terminal disclaimer.

(21) Appl. No.: 15/783,133

(22) Filed: Oct. 13, 2017

(65) Prior Publication Data

US 2018/0152634 A1    May 31, 2018

(30) Foreign Application Priority Data

Nov. 29, 2016 (CN) .......................... 2016 1 1079543

(51) Int. Cl.
*H04N 5/232* (2006.01)
*H04N 9/04* (2006.01)
(Continued)

(52) U.S. Cl.
CPC ....... *H04N 5/23232* (2013.01); *H04N 1/3871* (2013.01); *H04N 5/2355* (2013.01);
(Continued)

(58) Field of Classification Search
CPC .......... H04N 5/23232; H04N 5/23216; H04N 5/35563; H04N 5/2355; H04N 7/0142
See application file for complete search history.

(56) References Cited

U.S. PATENT DOCUMENTS 6,829,008 B1    12/2004 Kondo et al.
8,102,435 B2    1/2012 Castorina et al.
(Continued)

FOREIGN PATENT DOCUMENTS

CN    101150733 A    3/2008
CN    101227621 A    7/2008
(Continued)

OTHER PUBLICATIONS

PCT/CN2017/085213 International Search Report and Written Opinion dated Jul. 26, 2017, 13 pp.
(Continued)

*Primary Examiner* — Ahmed A Berhan
(74) *Attorney, Agent, or Firm* — Lathrop Gage LLP

(57) ABSTRACT

The present disclosure provides an image processing method, an image processing apparatus and an electronic device. The method includes: controlling the image sensor to output a color-block image; determining a predetermined area on the color-block image according to a user input; converting a first part of the color-block image inside the predetermined area into a first simulation image using a first interpolation algorithm; converting a second part of the color-block image outside the predetermined area into a second simulation image using a second interpolation algorithm, in which, a complexity of the second interpolation algorithm is less than that of the first interpolation algorithm; and merging the first simulation image and the second simulation image to generate a simulation image corresponding to the color-block image.

26 Claims, 23 Drawing Sheets

(51) Int. Cl.
*H04N 5/355* (2011.01)
*H04N 5/235* (2006.01)
*H04N 1/387* (2006.01)
*H04N 7/01* (2006.01)
*H04N 9/73* (2006.01)
*H04N 5/359* (2011.01)

(52) U.S. Cl.
CPC ..... *H04N 5/23216* (2013.01); *H04N 5/23293* (2013.01); *H04N 5/35563* (2013.01); *H04N 7/0142* (2013.01); *H04N 9/045* (2013.01); *H04N 9/735* (2013.01); *H04N 5/359* (2013.01); *H04N 2209/046* (2013.01)

(56) References Cited

U.S. PATENT DOCUMENTS

| | | | |
|---|---|---|---|
| 10,165,205 | B2 | 12/2018 | Tang |
| 2006/0098970 | A1 | 5/2006 | Sato |
| 2008/0055683 | A1 | 3/2008 | Choe et al. |
| 2009/0200451 | A1 | 8/2009 | Conners |
| 2012/0257081 | A1 | 10/2012 | Mine |
| 2012/0301044 | A1 | 11/2012 | Nakada |
| 2013/0202191 | A1 | 8/2013 | Wang |
| 2014/0267701 | A1 | 9/2014 | Aviv et al. |
| 2015/0009383 | A1 | 1/2015 | Fujii et al. |
| 2015/0181124 | A1 | 6/2015 | Basavaraja et al. |
| 2015/0332099 | A1 | 11/2015 | Kosubek et al. |
| 2015/0350555 | A1* | 12/2015 | Nishi ............... H04N 5/23293 348/333.02 |
| 2016/0037060 | A1 | 2/2016 | Lim et al. |

FOREIGN PATENT DOCUMENTS

| | | |
|---|---|---|
| CN | 102073986 A | 5/2011 |
| CN | 102630019 A | 8/2012 |
| CN | 103430552 A | 12/2013 |
| CN | 104280803 A | 1/2015 |
| CN | 104580942 A | 4/2015 |
| CN | 105120248 A | 12/2015 |
| CN | 105592303 A | 5/2016 |
| CN | 105609516 A | 5/2016 |
| CN | 106454289 A | 2/2017 |
| CN | 106488203 A | 3/2017 |
| CN | 106507019 A | 3/2017 |
| CN | 106507068 A | 3/2017 |
| CN | 106507069 A | 3/2017 |
| CN | 106604001 A | 4/2017 |
| EP | 0981245 A2 | 2/2000 |
| EP | 2753082 A1 | 7/2014 |

OTHER PUBLICATIONS

European Patent Application No. 17198892.6 extended Search and Opinion dated Apr. 19, 2018, 10 pages.
Chinese Patent Application No. 201611079543.2, English translation of Office Action dated Nov. 2, 2018, 6 pages.
Chinese Patent Application No. 201611079543.2, Office Action dated Nov. 2, 2018, 7 pages.
PCT/CN2017/087556 International Search Report and Written Opinion dated Jul. 27, 2017, 12 pages.
European Patent Application No. 17199860.2 extended Search and Opinion dated Apr. 20, 2018, 7 pages.

* cited by examiner

Merged image

| R | R | Gr | Gr |
|---|---|----|----|
| R | R | Gr | Gr |
| Gb | Gb | B | B |
| Gb | Gb | B | B | color-block image

Fig. 7

IMAGE PROCESSING METHOD AND APPARATUS, AND ELECTRONIC DEVICE

CROSS-REFERENCE TO RELATED APPLICATIONS

This application is based on and claims priority of Chinese Patent Application No. 201611079543.2, filed on Nov. 29, 2016, the entire contents of which are incorporated herein by reference.

FIELD

The present disclosure relates to the imaging technology field, and more particularly to an image processing method, an image processing apparatus and an electronic device.

BACKGROUND

When an image is processed using a conventional image processing method, either the obtained image has a low resolution, or it takes a long time and too much resource to obtain an image with high resolution, both of which are inconvenient for users.

DISCLOSURE

The present disclosure aims to solve at least one of existing problems in the related art to at least extent. Accordingly, the present disclosure provides an image processing method, an image processing apparatus and an electronic device.

Embodiments of the present disclosure provide an image processing method. The image processing method is applied in an electronic device. The electronic device includes an imaging apparatus including an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing method includes: controlling the image sensor to output a color-block image, in which, the color-block image includes image pixel units arranged in a preset array, each image pixel unit includes a plurality of original pixels, and each photosensitive pixel corresponds to one original pixel; determining a predetermined area on the color-block image according to a user input; converting a first part of the color-block image into a first simulation image using a first interpolation algorithm, in which, the first part of the color-block image is in the predetermined area, the first simulation image includes first simulation pixels arranged in a preset array, and each photosensitive pixel corresponds to one first simulation pixel; converting a second part of the color-block image into a second simulation image using a second interpolation algorithm, in which, a complexity of the second interpolation algorithm is less than that of the first interpolation algorithm, the second part of the color-block image is outside the predetermined area, the second simulation image includes second simulation pixels arranged in a preset array, and each photosensitive pixel corresponds to one second simulation pixel; and merging the first simulation image and the second simulation image to generate a simulation image corresponding to the color-block image.

Embodiments of the present disclosure further provide an image processing apparatus. The image processing apparatus is applied in an electronic device. The electronic device includes an imaging apparatus including an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The image processing apparatus includes a non-transitory computer-readable medium including computer-readable instructions stored thereon, and an instruction execution system which is configured y the instructions to implement at least one of a control module, a determining module, a first converting module, a second converting module and a merging module. The control module is configured to control the image sensor to output a color-block image. The color-block image includes image pixel units arranged in a preset array. Each image pixel unit includes a plurality of original pixels, and each photosensitive pixel corresponds to one original pixel. The determining module is configured to determine a predetermined area on the color-block image according to a user input. The first converting module is configured to convert a first part of the color-block image into a first simulation image using a first interpolation algorithm. The first part of the color-block image is in the predetermined area. The first simulation image includes first simulation pixels arranged in a preset array, and each photosensitive pixel corresponds to one first simulation pixel. The second converting module is configured to convert a second part of the color-block image into a second simulation image using a second interpolation algorithm. The second part of the color-block image is outside the predetermined area. A complexity of the second interpolation algorithm is less than that of the first interpolation algorithm. The second simulation image includes second simulation pixels arranged in a preset array, and each photosensitive pixel corresponds to one second simulation pixel. The merging module is configured to the first simulation image and the second simulation image to generate a simulation image corresponding to the color-block image.

Embodiments of the present disclosure provide an electronic device. The electronic device includes a housing, a processor, a memory, a circuit board, a power supply circuit, an imaging apparatus and an input component. The circuit board is enclosed by the housing. The processor and the memory are positioned on the circuit board. The power supply circuit is configured to provide power for respective circuits or components of the electronic device. The input component is configured to receive a user input. The imaging apparatus includes an image sensor. The image sensor includes an array of photosensitive pixel units and an array of filter units arranged on the array of photosensitive pixel units. Each filter unit corresponds to one photosensitive pixel unit, and each photosensitive pixel unit includes a plurality of photosensitive pixels. The memory is configured to store executable program codes. The processor is configured to run a program corresponding to the executable program codes by reading the executable program codes stored in the memory, to perform the image processing method according to embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

FIG. 7 is a schematic diagram of a color-block image according to an embodiment of the present disclosure.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the related art, an image sensor includes an array of photosensitive pixel units and an array of filter units arranged on the array of photosensitive pixel unit. Each filter unit corresponds to and covers one photosensitive pixel unit, and each photosensitive pixel unit includes a plurality of photosensitive pixels. When working, the image sensor is controlled to output a merged image. The merged image includes an array of merged pixels, and a plurality of photosensitive pixels in a same photosensitive pixel unit are collectively outputted as one merged pixel. Thus, a signal-to-noise ratio of the merge image is increased. However, a resolution of the merged image is reduced.

Certainly, the image sensor can be controlled to output a high pixel color-block image, which includes an array of original pixels, and each photosensitive pixel corresponds to one original pixel. However, since a plurality of original pixels corresponding to a same filter unit have the same color, the resolution of the color-block image still cannot be increased. Thus, the high pixel color-block image needs to be converted into a high pixel simulation image by an interpolation algorithm, in which the simulation image includes a Bayer array of simulation pixels. Then, the simulation image can be converted into a simulation true-color image by an image processing method and saved. The interpolation algorithm can improve the resolution of the true-color image. However, the interpolation algorithm consumes resource and time, resulting in longer shooting time and poor user experience. In another aspect, in specific applications, the user only pays attention to the resolution of main part of the true-color image.

Thus, embodiments of the present disclosure provide a novel image processing method.

Figure 1:
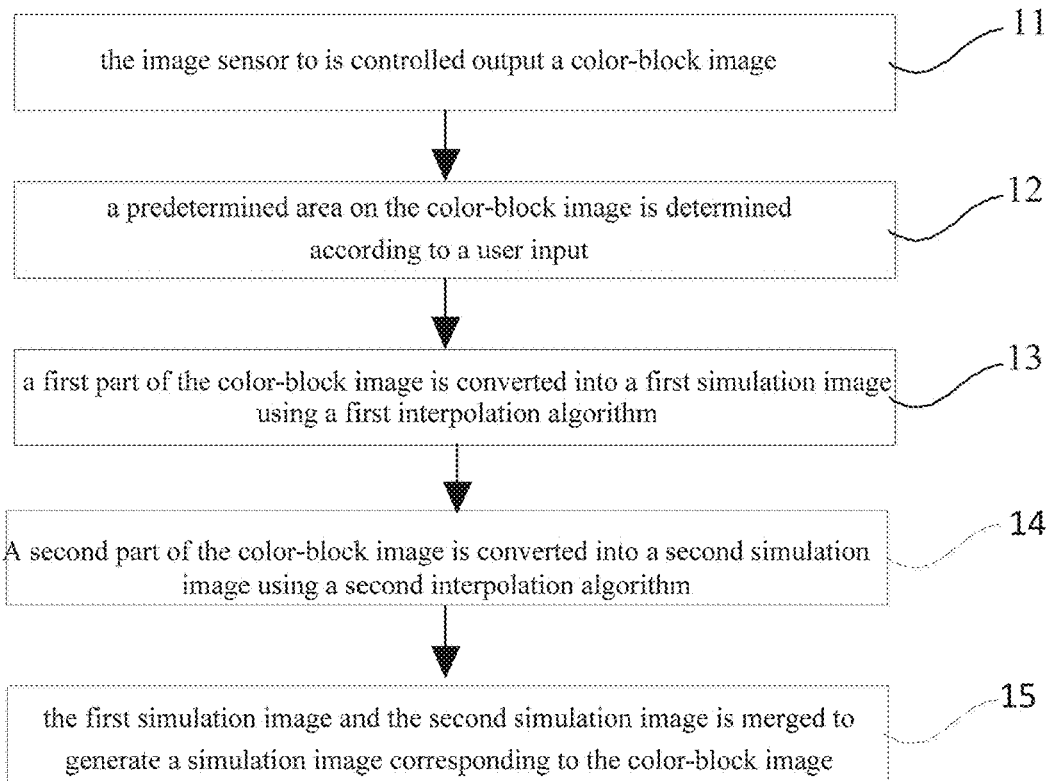
FIG. 1 is a flow chart of an image processing method according to an embodiment of the present disclosure.
Figure 2:
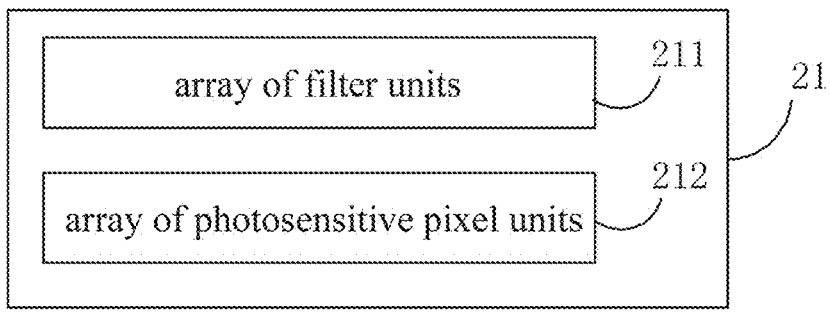
FIG. 2 is a block diagram of an image sensor according to an embodiment of the present disclosure.
Figure 3:
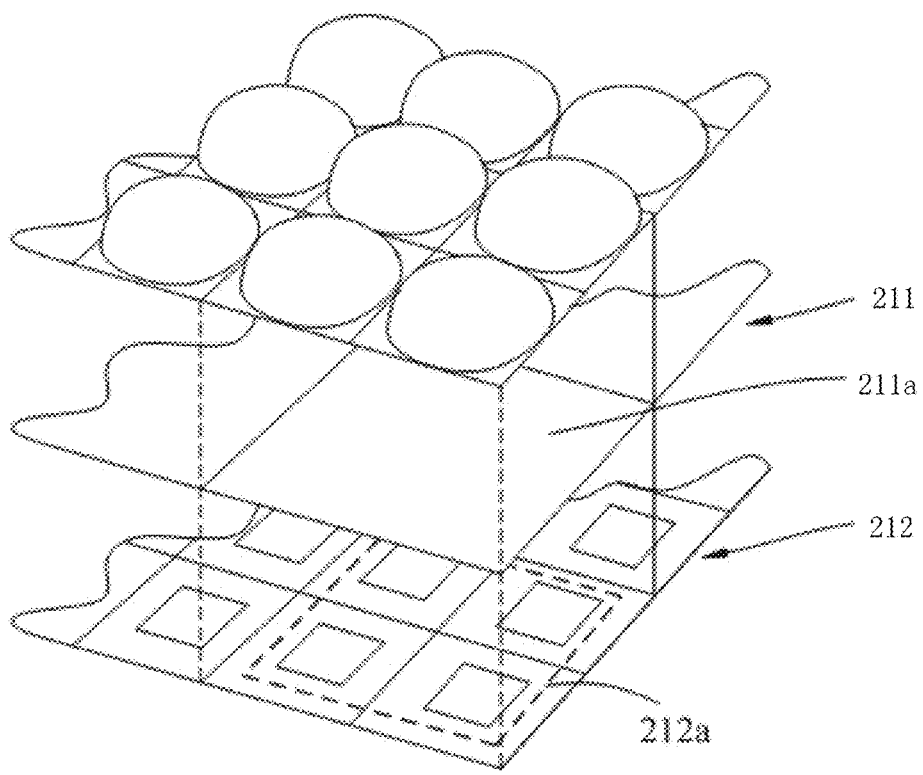
FIG. 3 is a schematic diagram of an image sensor according to an embodiment of the present disclosure.

Referring to FIG. 1, an image processing method is illustrated. The image processing method is applied in an electronic device. The electronic device includes an imaging apparatus including an image sensor. As illustrated in FIG. 2, the image sensor 21 includes an array 212 of photosensitive pixel units and an array 211 of filter units arranged on the array 212 of photosensitive pixel units. As illustrated in FIG. 3, each filter unit 211a corresponds to and cover one photosensitive pixel unit 212a, and each photosensitive pixel unit 212a includes a plurality of photosensitive pixels 2121. The image processing method includes the followings.

At block 11, the image sensor is controlled to output a color-block image.

The color-block image includes image pixel units arranged in a preset array. Each image pixel unit includes a plurality of original pixels. Each photosensitive pixel unit 212a corresponds to one image pixel unit, and each photosensitive pixel corresponds to one original pixel.

At block 12, a predetermined area on the color-block image is determined according to a user input.

At block 13, a first part of the color-block image is converted into a first simulation image using a first interpolation algorithm.

The first part of the color-block image is in the predetermined area. The first simulation image includes first simulation pixels arranged in a preset array, and each photosensitive pixel corresponds to one first simulation pixel.

At block 14, a second part of the color-block image is converted into a second simulation image using a second interpolation algorithm.

The second part of the color-block image is outside the predetermined area. The second simulation image includes second simulation pixels arranged in a preset array, and each photosensitive pixel corresponds to one second simulation pixel.

At block 15, the first simulation image and the second simulation image are merged to generate a simulation image corresponding to the color-block image.

With the image processing method according to embodiments of the present disclosure, the first part of the color-block image in the predetermined area and the second part of the color-block image outside the predetermined area are processed using the first interpolation algorithm and the second interpolation algorithm, respectively. The complexity of the first interpolation algorithm is greater than that of the second interpolation algorithm. Therefore, in actual shooting, by performing the image processing only on a part of the image using the first interpolation algorithm with large complexity, data and time required for the image processing can be reduced effectively, the resolution of the image of the main part (that is, the first part of the color-block image) can be improved, and the user experience is improved.

Figure 4:
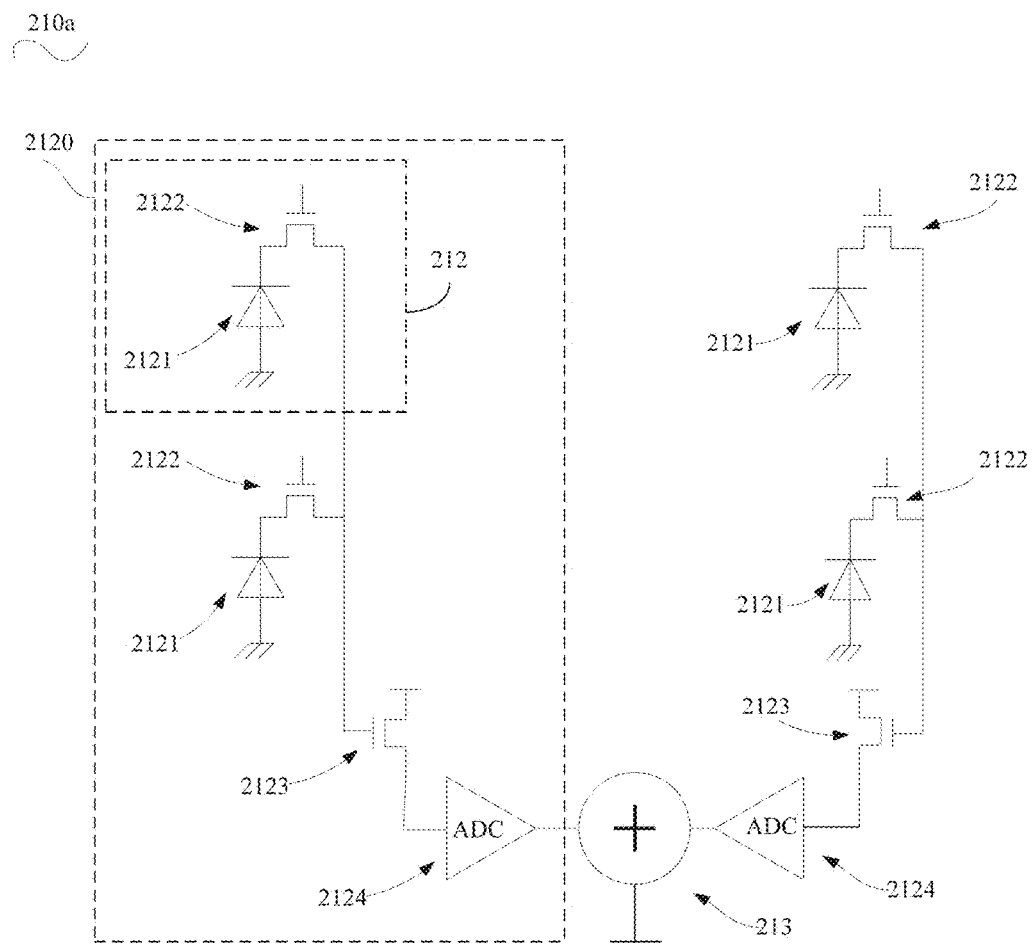
FIG. 4 is a schematic diagram illustrating a circuit of an image sensor according to an embodiment of the present disclosure.
Figure 5:
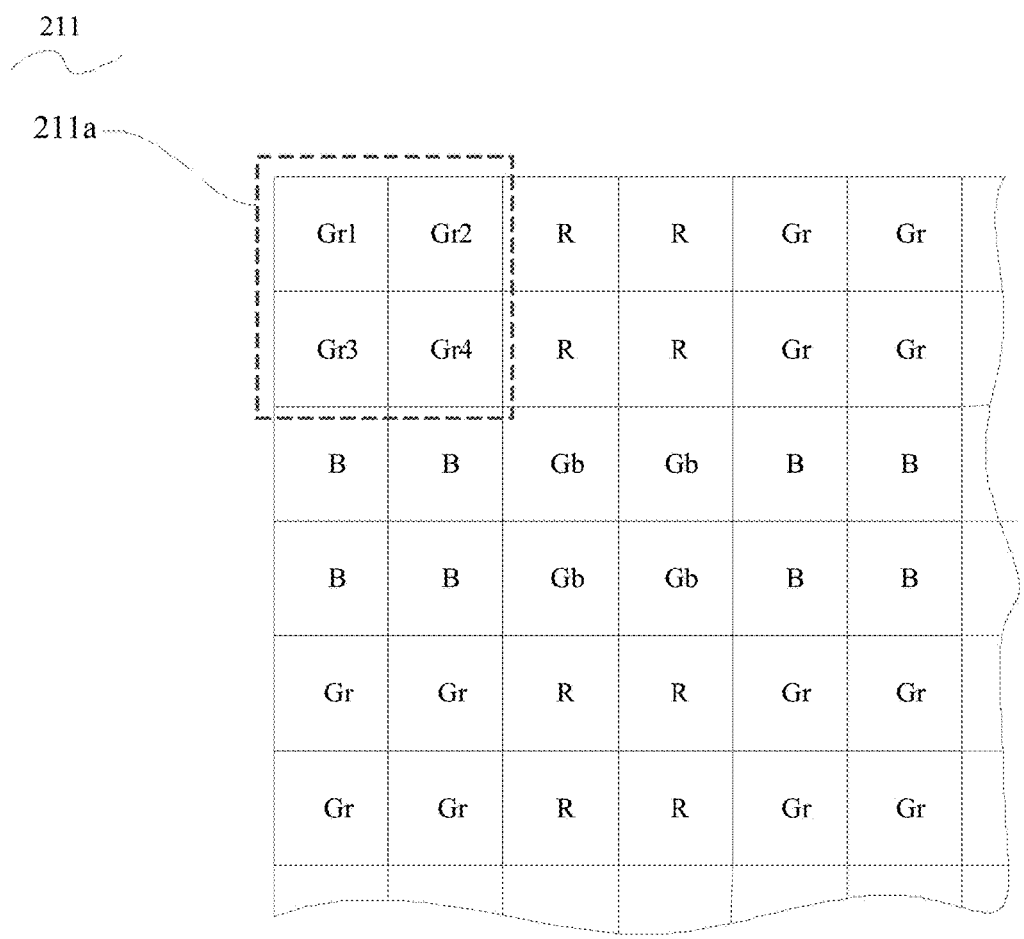
FIG. 5 is a schematic diagram of an array of filter units according to an embodiment of the present disclosure.

FIG. 4 is a schematic diagram illustrating a circuit of an image sensor according to an embodiment of the present disclosure. FIG. 5 is a schematic diagram of an array of filter units according to an embodiment of the present disclosure. FIGS. 2-5 are better viewed together.

Referring to FIGS. 2-5, the image sensor 21 according to an embodiment of the present disclosure includes an array 212 of photosensitive pixel units and an array 211 of filter units arranged on the array 212 of photosensitive pixel units.

Further, the array 212 of photosensitive pixel units includes a plurality of photosensitive pixel units 212a. Each photosensitive pixel unit 212a includes a plurality of adjacent photosensitive pixels 2121. Each photosensitive pixel 2121 includes a photosensitive element 21211 and a transmission tube 21212. The photosensitive element 21211 may be a photodiode, and the transmission tube 21212 may be a MOS transistor.

The array 211 of filter units includes a plurality of filter units 211a. Each filter unit 211a corresponding to one photosensitive pixel unit 212a.

In detail, in some examples, the filter units are arranged in a Bayer array. In other words, four adjacent filter units 211a include one red filter unit, one blue filter unit and two green filter units.

Each photosensitive pixel unit 212a corresponds to a filter unit 211a with a same color. If a photosensitive pixel unit 212a includes n adjacent photosensitive elements 21211, one filter unit 211a covers n photosensitive elements 21211 in one photosensitive pixel unit 212a. The filter unit 211a may be formed integrally, or may be formed by assembling n separate sub filters.

In some implementations, each photosensitive pixel unit 212a includes four adjacent photosensitive pixels 2121. Two adjacent photosensitive pixels 2121 collectively form one photosensitive pixel sub-unit 2120. The photosensitive pixel sub-unit 2120 further includes a source follower 21213 and an analog-to-digital converter 21214. The photosensitive pixel unit 212a further includes an adder 2122. A first electrode of each transmission tube 21212 in the photosensitive pixel sub-unit 2120 is coupled to a cathode electrode of a corresponding photosensitive element 21211. Second electrodes of all the transmission tubes 21212 are collectively coupled to a gate electrode of the source follower 21213 and coupled to an analog-to-digital converter 21214 via the source electrode of the source follower 21213. The source follower 21213 may be a MOS transistor. Two photosensitive pixel sub-units 2120 are coupled to the adder 2122 via respective source followers 21213 and respective analog-to-digital converters 21214.

In other words, four adjacent photosensitive elements 21211 in one photosensitive pixel unit 212a of the image sensor 21 according to an embodiment of the present disclosure collectively use one filter unit 211a with a same color as the photosensitive pixel unit. Each photosensitive element 21211 is coupled to a transmission tube 21212 correspondingly. Two adjacent photosensitive elements 21211 collectively use one source follower 21213 and one analog-digital converter 21214. Four adjacent photosensitive elements 21211 collectively use one adder 2122.

Further, four adjacent photosensitive elements 21211 are arranged in a 2-by-2 array. Two photosensitive elements 21211 in one photosensitive pixel sub-unit 2120 can be in a same row.

During an imaging process, when two photosensitive pixel sub-units 2120 or four photosensitive elements 21211 covered by a same filter unit 211a are exposed simultaneously, pixels can be merged, and the merged image can be outputted.

In detail, the photosensitive element 21211 is configured to convert light into charges, and the amount of charges is proportional to an illumination intensity. The transmission tube 21212 is configured to control a circuit to turn on or off according to a control signal. When the circuit is turned on, the source follower 21213 is configured to convert the charge generated through light illumination into a voltage signal. The analog-to-digital converter 21214 is configured to convert the voltage signal into a digital signal. The adder 2122 is configured to add and output two digital signals for processing by an imaging module connected with the image sensor 21.

Figure 6:
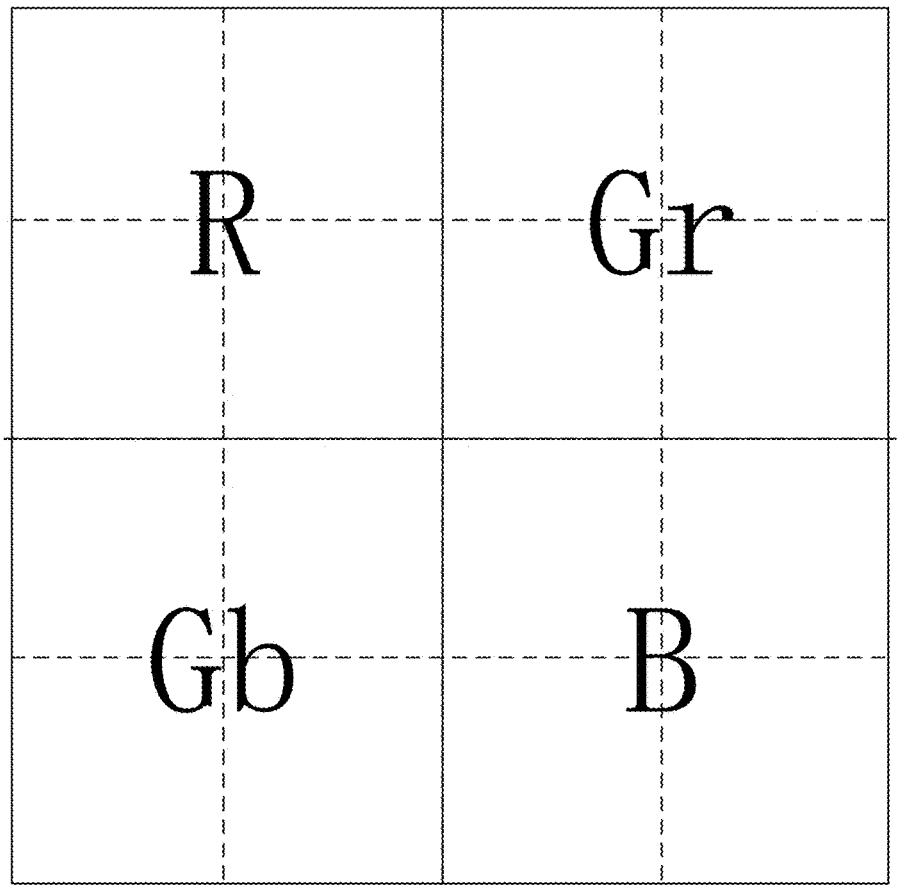
FIG. 6 is a schematic diagram of a merged image according to an embodiment of the present disclosure.

Referring to FIG. 6, take an image sensor 21 of 16M as an example. The image sensor 21 according to an embodiment of the present disclosure can merge photosensitive pixels of 16M into photosensitive pixels of 4M, i.e., the image sensor 21 outputs the merged image. After the merging, the photosensitive pixel quadruples in size, such that the photosensibility of the photosensitive pixel is increased. In addition, since most part of noise in the image sensor 21 is random, there may be noise points at one or two pixels. After four photosensitive pixels are merged into a big photosensitive pixel, an effect of noise points on the big photosensitive pixel is reduced, i.e., the noise is weaken and SNR (signal to noise ratio) is improved.

However, when the size of the photosensitive pixel is increased, the number of pixels is decreased, and thus the resolution of the merged image is decreased.

During an imaging process, when four photosensitive elements 21211 covered by a same filter unit 211a are exposed in sequence, the color-block image is output.

In detail, the photosensitive element 21211 is configured to convert light into charges, and the amount of charges is proportional to an illumination intensity. The transmission tube 21212 is configured to control a circuit to turn on or off according to a control signal. When the circuit is turned on, the source follower 21213 is configured to convert the charge generated by the photosensitive element 21211 through light illumination into a voltage signal. The analog-to-digital converter 21214 is configured to convert the voltage signal into a digital signal for processing by the imaging module connected with the image sensor 21.

Referring to FIG. 7, take an image sensor 21 of 16M as an example. The image sensor 21 according to an embodiment of the present disclosure can output photosensitive pixels of 16M, i.e., the image sensor 21 outputs the color-block image. The color-block image includes image pixel units. The image pixel unit includes original pixels arranged in a 2-by-2 array. The size of the original pixel is the same as that of the photosensitive pixel. However, since filter unit 211a covering four adjacent photosensitive elements 21211 has a same color (i.e., although four photosensitive elements 21211 are exposed respectively, the filter unit 211a covers the four photosensitive elements has a same color), four adjacent original pixels in each image pixel unit of the output image have a same color, and thus the resolution of the image cannot be increased.

The image processing method according to an embodiment of the present disclosure is able to process the output color-block image to obtain the simulation image.

In some embodiments, when a merged image is output, four adjacent photosensitive pixels with the same color can be output as one merged pixel. Accordingly, four adjacent photosensitive pixels in the merged image can be considered as being arranged in a typical Bayer array, and can be processed directly to output a merged true-color image. When a color-block image is output, each photosensitive pixel is output separately. Since four adjacent photosensitive pixels have a same color, four adjacent original pixels in an image pixel unit have a same color, which form an untypical Bayer array. However, the untypical Bayer array cannot be directly processed. In other words, when the image sensor 21 adopts a same apparatus for processing the image, in order to realize a compatibility of the true-color image outputs under two modes (i.e., the merged true-color image under a merged mode and the simulation true-color image under a color-block mode), it is required to convert the color-block image into the simulation image, or to convert the image pixel units in an untypical Bayer array into pixels arranged in the typical Bayer array.

Figure 8:
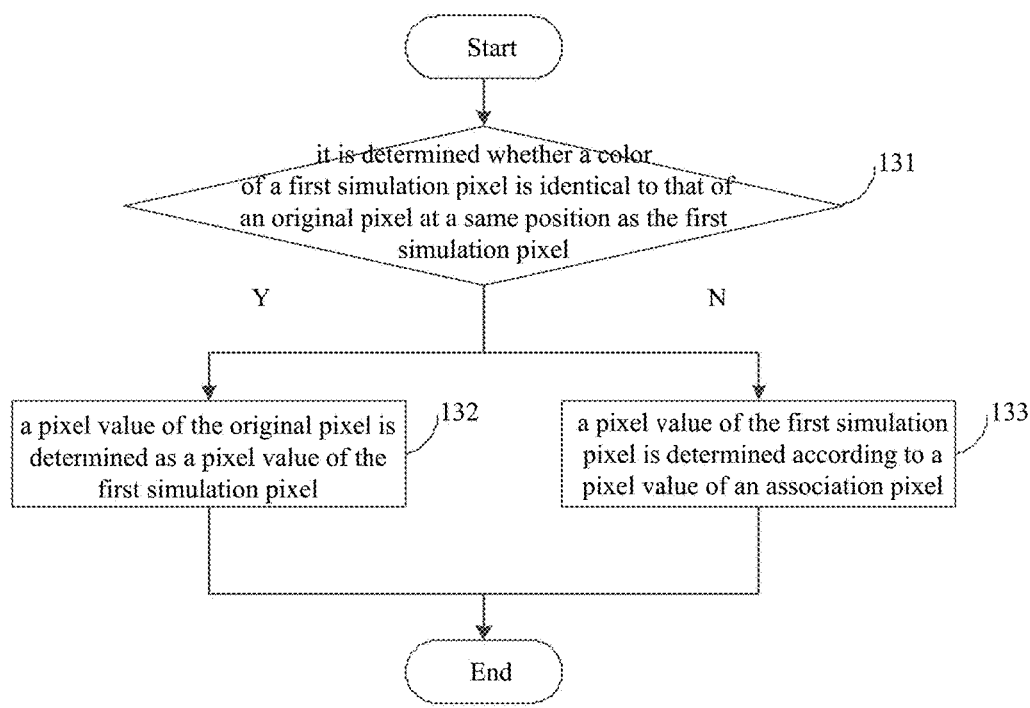
FIG. 8 is a flow chart illustrating a process of converting a first part of a color-block image into a first simulation image according to an embodiment of the present disclosure.

For the first part of the color-block image in the predetermined area, the original pixels are converted into first simulation pixels in the Bayer array using the first interpolation algorithm. Referring to FIG. 8, in some implementations, the act at block 13 includes the followings.

At block 131, it is determined whether a color of a first simulation pixel is identical to that of an original pixel at a same position as the first simulation pixel, if yes, an act at block 132 is executed, otherwise, an act at block 133 is executed.

At block 132, a pixel value of the original pixel is determined as a pixel value of the first simulation pixel.

At block 133, the pixel value of the first simulation pixel is determined according to a pixel value of an association pixel.

The association pixel is selected from an image pixel unit with a same color as the first simulation pixel and adjacent to the original pixel.

Figure 9:
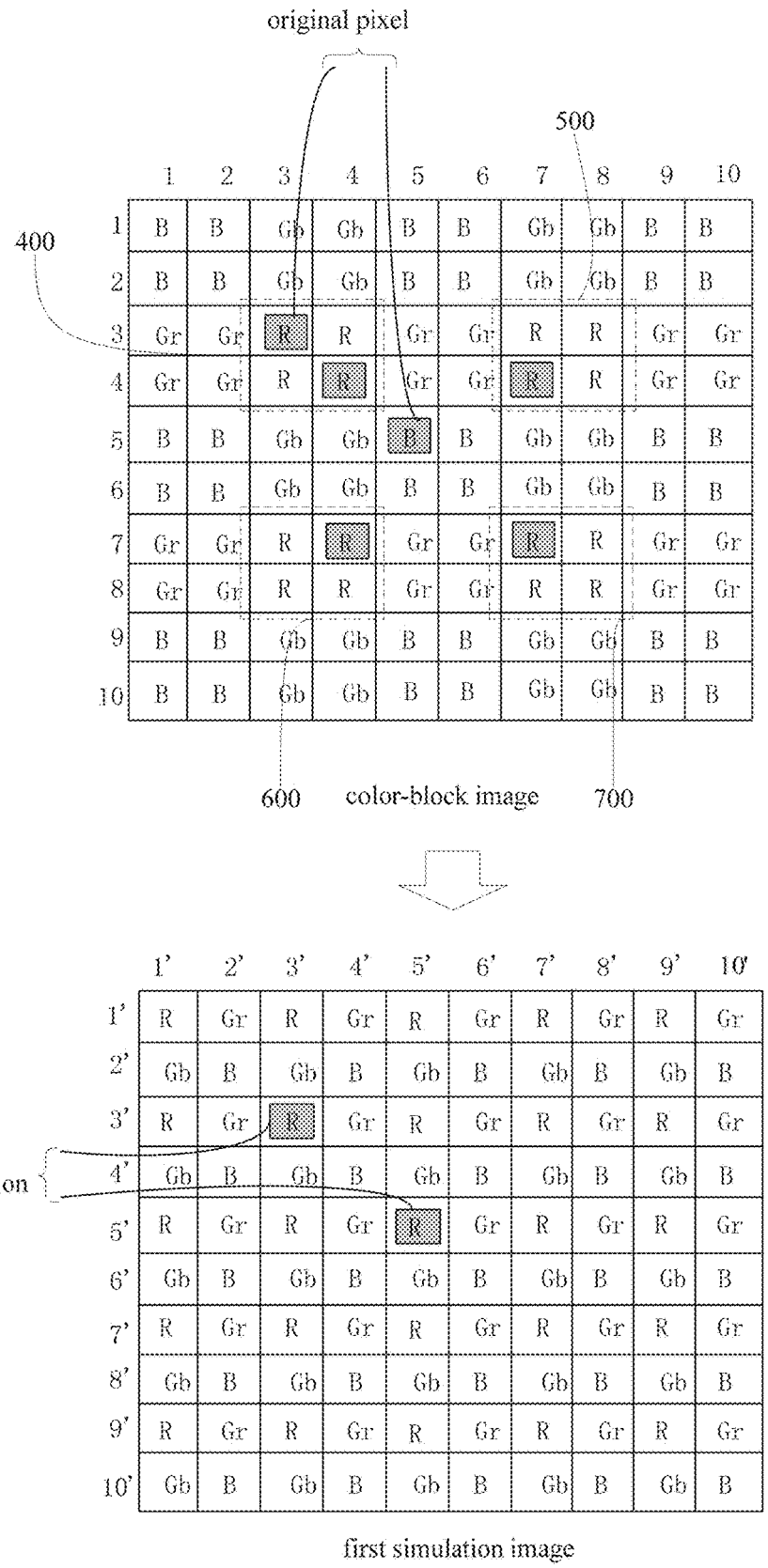
FIG. 9 is a schematic diagram illustrating a process of converting a first part of a color-block image into a first simulation image according to an embodiment of the present disclosure.

Referring to FIG. 9, the first interpolation algorithm is illustrated. For the first simulation pixels R3'3' and R5'5', the corresponding original pixels are R33 and B55.

When the first simulation pixel R3'3' is obtained, since the first simulation pixel R3'3' has the same color as the corresponding original pixel R33, the pixel value of the original pixel R33 is directly determined as the pixel value of the first simulation pixel R3'3' during conversion.

When the first simulation pixel R5'5' is obtained, since the first simulation pixel R5'5' has a color different from that of the corresponding original pixel B55, the pixel value of the original pixel B55 cannot be directly determined as the pixel value of the first simulation pixel R5'5', and it is required to calculate the pixel value of the first simulation pixel R5'5' according to an association pixel of the simulation pixel R5'5' by the first interpolation algorithm.

It should be noted that, a pixel value of a pixel mentioned in the context should be understood in a broad sense as a color attribute value of the pixel, such as a color value.

The association pixel is selected from an association pixel unit. There may be more than one association pixel unit for each first simulation pixel, for example, there may be four association pixel units, in which the association pixel units have the same color as the first simulation pixel and are adjacent to the original pixel at the same position as the first simulation pixel.

It should be noted that, "adjacent" here should be understood in a broad sense. Take FIG. 9 as an example, the first simulation pixel R5'5' corresponds to the original pixel B55. The image pixel units 400, 500, 600 and 700 are selected as the association pixel units, but other red image pixel units far away from the image pixel unit where the original pixel B55 is located are not selected as the association pixel units. In each association pixel unit, the red original pixel closest to the original pixel B55 is selected as the association pixel, which means that the association pixels of the first simulation pixel R5'5' include the original pixels R44, R74, R47 and R77. The first simulation pixel R5'5' is adjacent to and has the same color as the original pixels R44, R74, R47 and R77.

Figure 10:
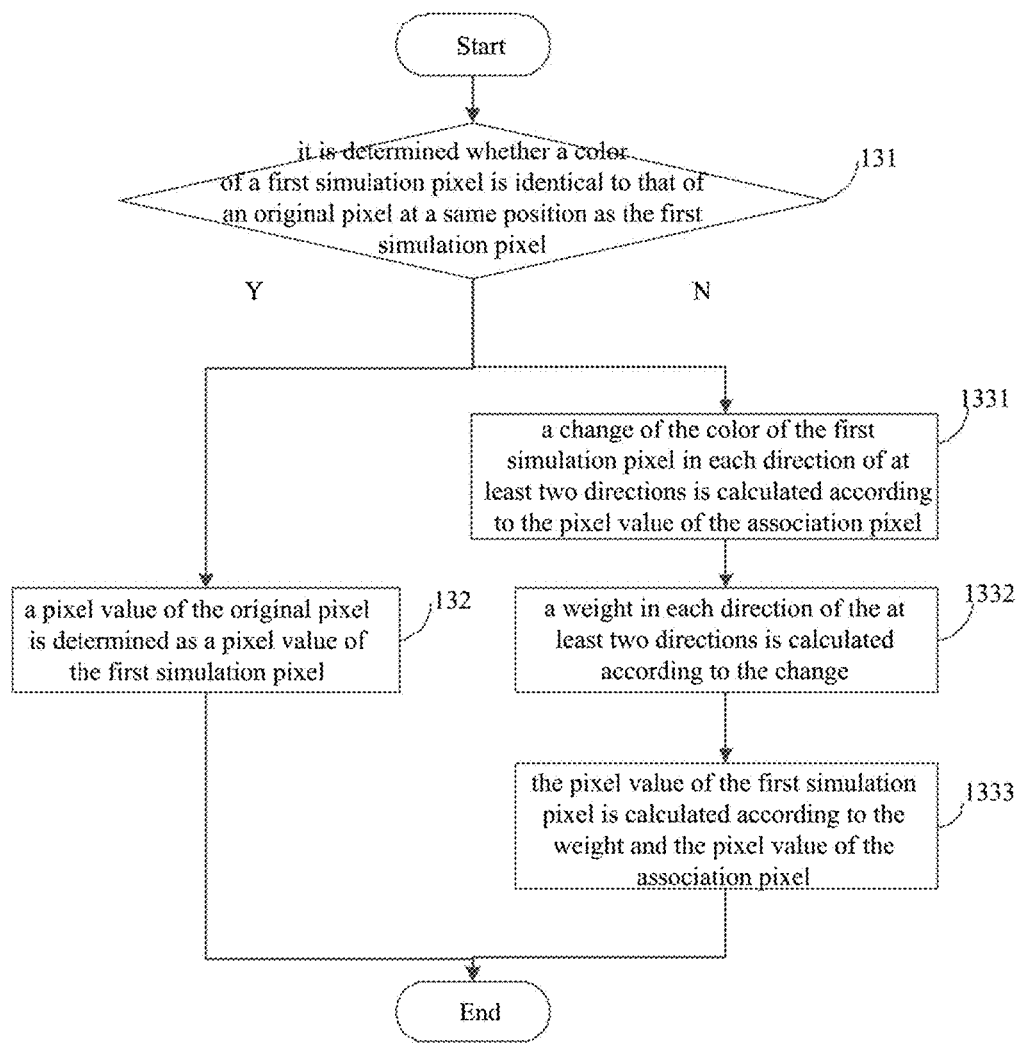
FIG. 10 is a flow chart illustrating a process of determining a pixel value of a first simulation pixel according to a pixel value of an association pixel according to an embodiment of the present disclosure.

Referring to FIG. 10, in some implementations, the act at block 133 (i.e., determining the pixel value of the first simulation pixel according to a pixel value of an association pixel) includes the followings.

At block 1331, a change of the color of the first simulation pixel in each direction of at least two directions is calculated according to the pixel value of the association pixel.

At block 1332, a weight in each direction of the at least two directions is calculated according to the change.

At block 1333, the pixel value of the first simulation pixel is calculated according to the weight and the pixel value of the association pixel.

In detail, the first interpolation algorithm is realized as follows: with reference to energy changes of the image in different directions and according to weights of the association pixels in different directions, the pixel value of the first simulation pixel is calculated by a linear interpolation. From the direction having a smaller energy change, it can get a higher reference value, i.e., the weight for this direction in the interpolation is high.

In some examples, for sake of convenience, only the horizontal direction and the vertical direction are considered.

The pixel value of the first simulation pixel R5'5' is obtained by an interpolation based on the original pixels R44, R74, R47 and R77. Since there is no original pixel with a same color as the first simulation pixel (i.e., R) in the horizontal direction and the vertical direction of the original pixel R55 corresponding to the first simulation pixel R5'5', a component of this color (i.e., R) in each of the horizontal direction and the vertical direction is calculated according to the association pixels. The components in the horizontal direction are R45 and R75, and the components in the vertical direction are R54 and R57. All the components can be calculated according to the original pixels R44, R74, R47 and R77.

In detail, R45=R44*2/3+R47*1/3, R75=2/3*R74+1/3*R77, R54=2/3*R44+1/3*R74, R57=2/3*R47+1/3*R77.

The change of color and the weight in each of the horizontal direction and the vertical direction are calculated respectively. In other words, according to the change of color in each direction, the reference weight in each direction used in the interpolation is determined. The weight in the direction with a small change is high, while the weight in the direction with a big change is low. The change in the horizontal direction is X1=|R45-R75|. The change in the vertical direction is X2=|R54-R57|, W1=X1/(X1+X2), W2=X2/(X1+X2).

After the above calculation, the pixel value of the first simulation pixel R5'5' can be calculated as R5'5'=(2/3*R45+1/3*R75)*W2+(2/3*R54+1/3*R57)*W1 . It can be understood that, if X1>X2, then W1>W2. The weight in the horizontal direction is W2, and the weight in the vertical direction is W1, vice versa.

Accordingly, the pixel value of the first simulation pixel can be calculated by the first interpolation algorithm. After the calculations on the association pixels, the original pixels can be converted into the first simulation pixels arranged in the typical Bayer array. In other words, four adjacent first simulation pixels arranged in the 2-by-2 array include one red simulation pixel, two green simulation pixels and one blue simulation pixel.

It should be noted that, the first interpolation algorithm is not limited to the above-mentioned method, in which only the pixel values of pixels with a same color as the first simulation pixel in the vertical direction and the horizontal direction are considered during calculating the pixel value of the first simulation pixel. In other embodiments, pixel values of pixels with other colors can also be considered.

Figure 11:
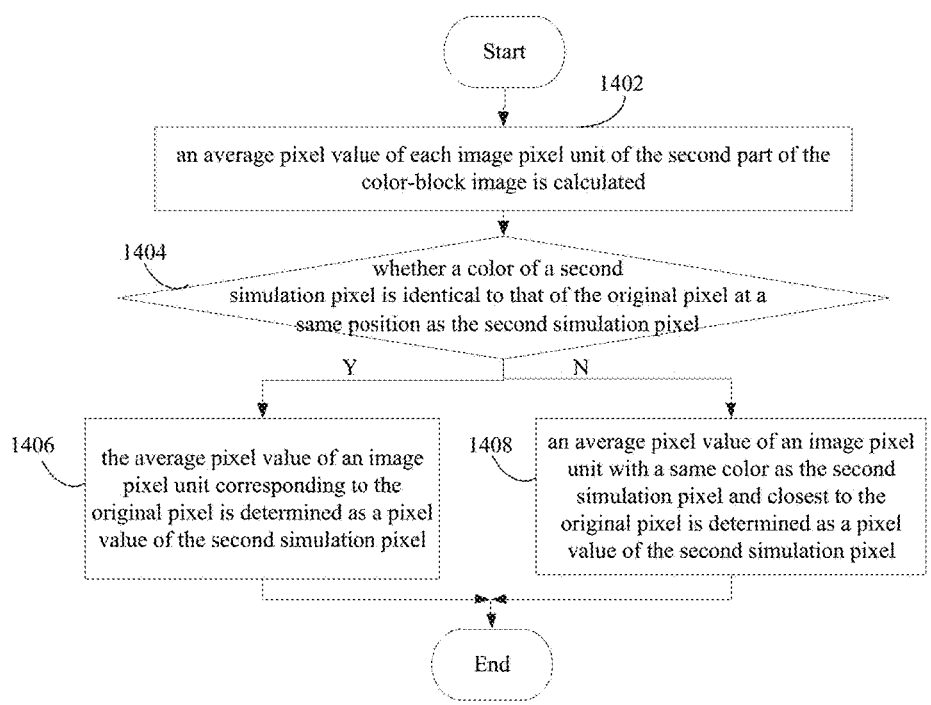
FIG. 11 is a flow chart illustrating a process of converting a second part of a color-block image into a second simulation image according to an embodiment of the present disclosure.

For the second part of the color-block image outside the predetermined area, the original pixels are converted into the second simulation pixels in the Bayer array using the second interpolation algorithm. Referring to FIG. 11, in some embodiments, the act at block 14 includes the followings.

At block 1402, an average pixel value of each image pixel unit of the second part of the color-block image is calculated.

At block 1404, it is determined whether a color of a second simulation pixel is identical to that of the original pixel at a same position as the second simulation pixel.

At block 1406, when the color of the second simulation pixel is identical to that of the original pixel at the same position as the second simulation pixel, the average pixel value of an image pixel unit corresponding to the original pixel is determined as a pixel value of the second simulation pixel.

At block 1408, when the color of the second simulation pixel is different from that of the original pixel at the same position as the second simulation pixel, an average pixel value of an image pixel unit with a same color as the second simulation pixel and closest to the original pixel is determined as the pixel value of the second simulation pixel.

Figure 12:
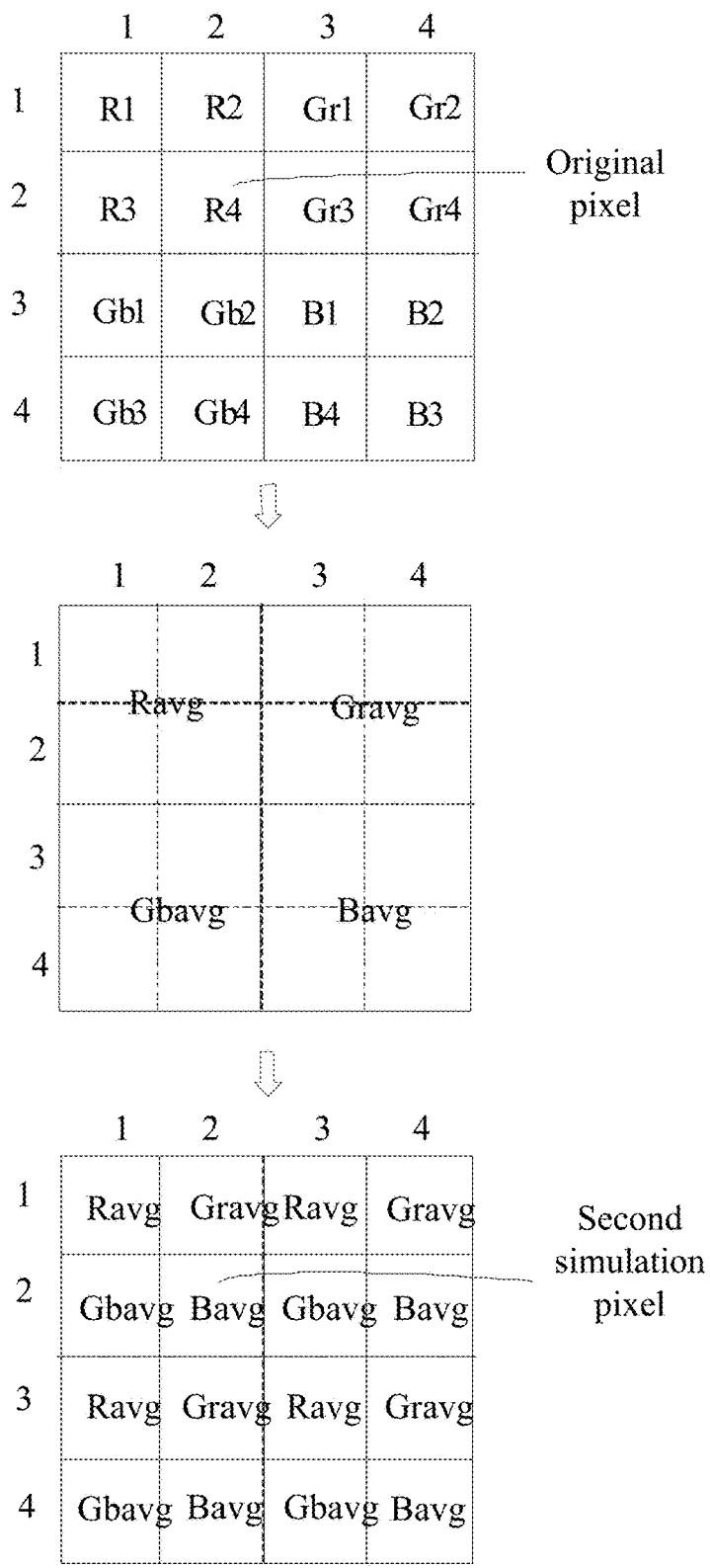
FIG. 12 is a schematic diagram illustrating converting a second part of a color-block image into a second simulation image according to an embodiment of the present disclosure.

Referring to FIG. 12, and taking FIG. 12 as an example, the pixel value of each original pixel in the image pixel unit is calculated as Ravg=(R1+R2+R3+R4)/4, Gravg=(Gr1+Gr2+Gr3+Gr4)/4, Gbavg=(Gb1+Gb2+Gb3+Gb4)/4, and Bavg=(B1+B2+B3+B4)/4. Here, the pixel values of the original pixels R11, R12, R21 and R22 are all equal to Ravg, the pixel values of the original pixels Gr31, Gr32, Gr41 and Gr42 are all equal to Gravg, the pixel values of the original pixels Gb13, Gb14, Gb23, and Gb24 are all equal to Gbavg, and the pixel values of the original pixels B33, B34, B43 and B44 are all equal to Bavg. Taking the simulation pixel B22 as an example, the corresponding original pixel is R22. The second simulation pixel B22 is taken as an example, the corresponding original pixel having the same position as the second simulation pixel B22 is R22. Since the second simulation pixel B22 has a color different from that of the corresponding original pixel R22, the pixel value of the second simulation pixel B22 may be determined as the pixel value corresponding to the closest blue filter, i.e., the pixel value Bavg of any of original pixels B33, B34, B43 and B44. Similarly, other colors can also be calculated using the second interpolation algorithm to obtain the pixel values of respective second simulation pixels.

Accordingly, for the part of the color-block image outside the high brightness area, the original pixel is converted into the second simulation pixel using the second interpolation algorithm. Since the complexity of the second interpolation algorithm is less than that of the first interpolation algorithm, the time required for the image processing is reduced and the user experience is improved.

For different parts of the color-block image, the original pixels can be converted into the simulation pixels in different ways, thus converting the color-block image into the simulation image. Since the filters in the Bayer array are adopted when shooting the image, the SNR of the image is improved. During the image processing procedure, the interpolation processing is performed on the color-block image, such that the distinguishability and resolution of the image can be improved.

Further, for the part of the image within the predetermined area and the part of the image outside the predetermined area, different interpolation algorithms are used. The predetermined area may be selected by the user in many ways.

Figure 13:
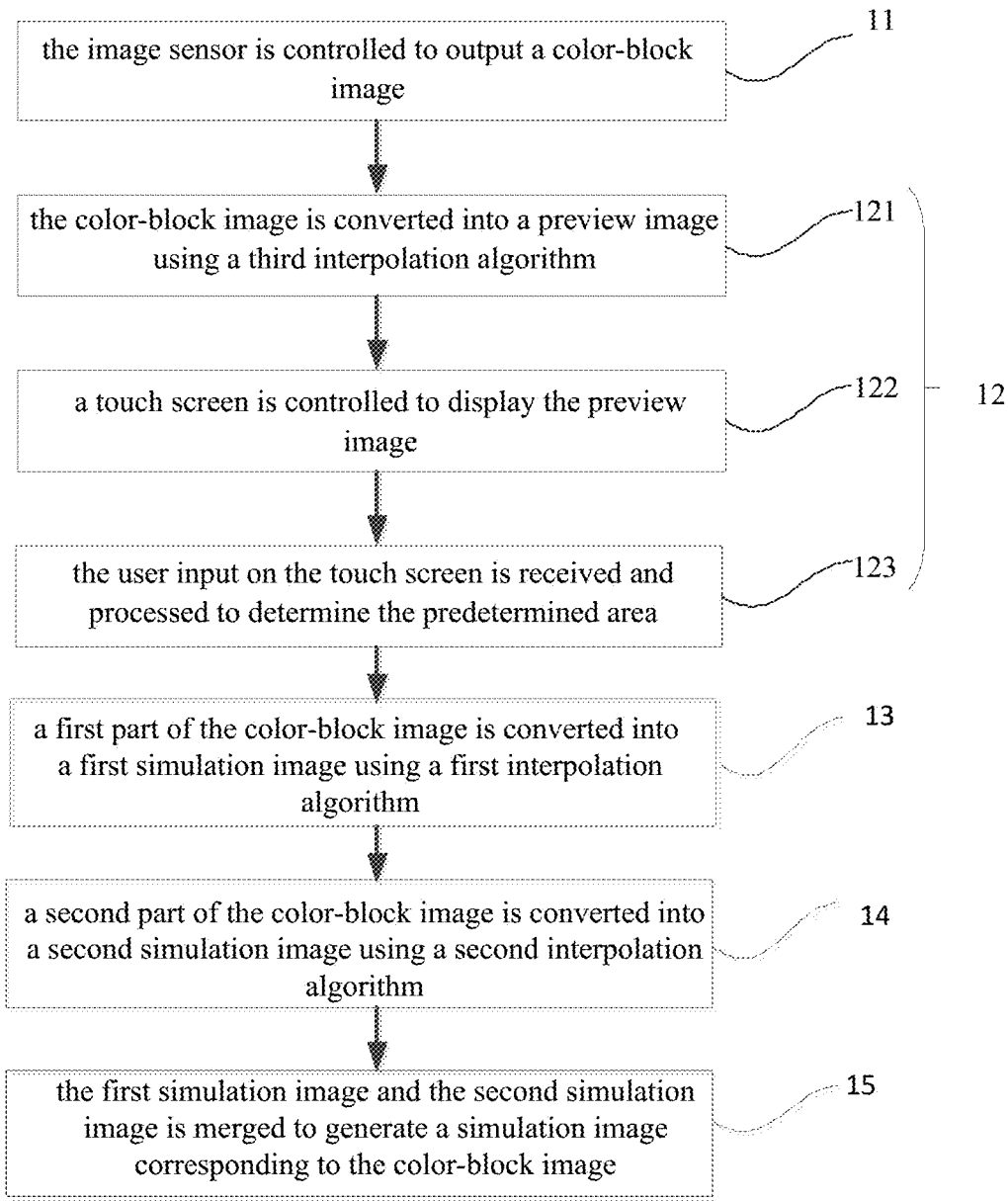
FIG. 13 is a flow chart illustrating determining a predetermined area according to an embodiment of the present disclosure.

Referring to FIG. 13, in some embodiments, the act at block 12 includes the followings.

At block 121, the color-block image is converted into a preview image using a third interpolation algorithm.

At block 122, a touch screen is controlled to display the preview image.

At block 123, the user input on the touch screen is received and processed to determine the predetermined area.

It should be understood that, the user needs to select the predetermined area in the preview image. The process of converting the color-block image into the preview image is calculated using a third interpolation algorithm. The third interpolation algorithm includes the second interpolation algorithm and a bilinear interpolation algorithm. During the conversion, the color-block image is converted into the simulation image with simulation pixels arranged in the Bayer array using the second interpolation algorithm first, and then the simulation image is converted into the true-color image using the bilinear interpolation algorithm. In this way, the user can preview the image, thus allowing the user to select the predetermined area.

It should be noted that, the algorithm of converting the simulation image into the true-color image is not limited to the bilinear interpolation algorithm, and other interpolation algorithms can also be used.

Figure 14:
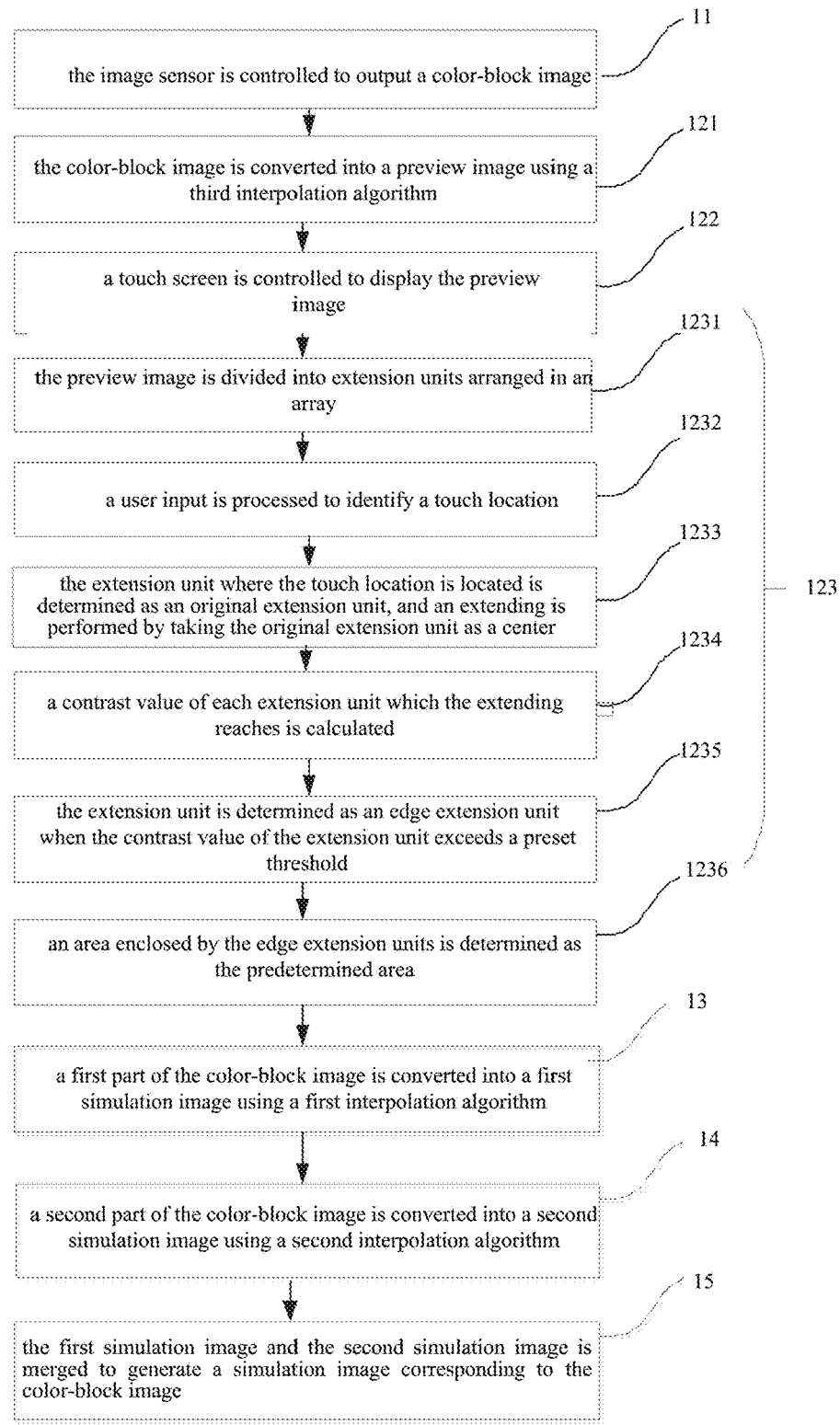
FIG. 14 is a flow chart illustrating determining a predetermined area according to an embodiment of the present disclosure.

Referring to FIG. 14, in some embodiments, the act at block 123 includes the followings.

At block 1231, the preview image is divided into extension units arranged in an array.

At block 1232, the user input is processed to identify a touch location.

At block 1233, the extension unit where the touch location is determined as an original extension unit, and an extending is performed by taking the original extension unit as a center.

At block 1234, a contrast value of each extension unit which the extending reaches is calculated.

At block 1235, the extension unit is determined as an edge extension unit when the contrast value of the extension unit exceeds a preset threshold.

At block 1236, an area enclosed by the edge extension units is determined as the predetermined area.

Figure 15:
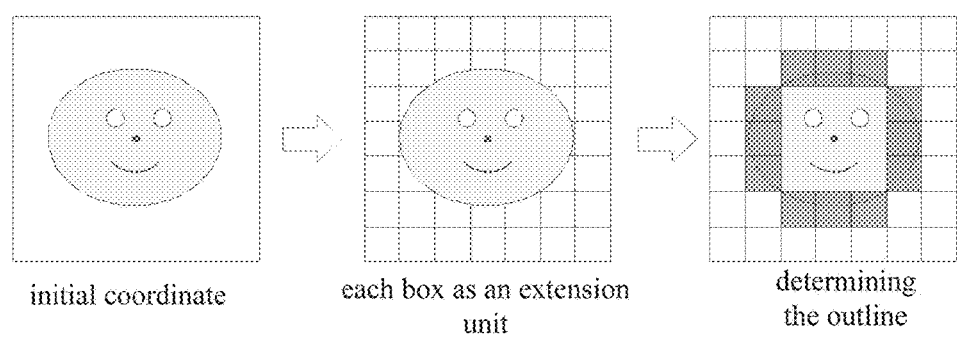
FIG. 15 is a schematic diagram of determining a predetermined area according to an embodiment of the preset disclosure.

In detail, referring to FIG. 15, and taking FIG. 15 as an example, the touch location of the user is represented by the black dot. Taking the touch location as the original extension unit, an extending is performed outwards. Each box in FIG. 15 is an extension unit. The contrast value of each extension unit is compared with the preset threshold, and the extension unit whose contrast value is greater than the preset threshold is determined as the edge extension unit. In FIG. 15, the contrast value of the extension unit where the edge of the face is located is greater than the preset threshold, and thus the extension units where the edge of the face is located are the edge extension unit, i.e., the grey boxes are the edge extension units. In this way, the area enclosed by multiple edge extension units is determined as the predetermined area, and the predetermined area is the processing area specified by the user (i.e., the main part gaining the user's attention). The part of image inside the area is processed using the first interpolation algorithm, thus improving the resolution of the main part of the image which gains the user's attention, and improving the user experience.

Figure 16:
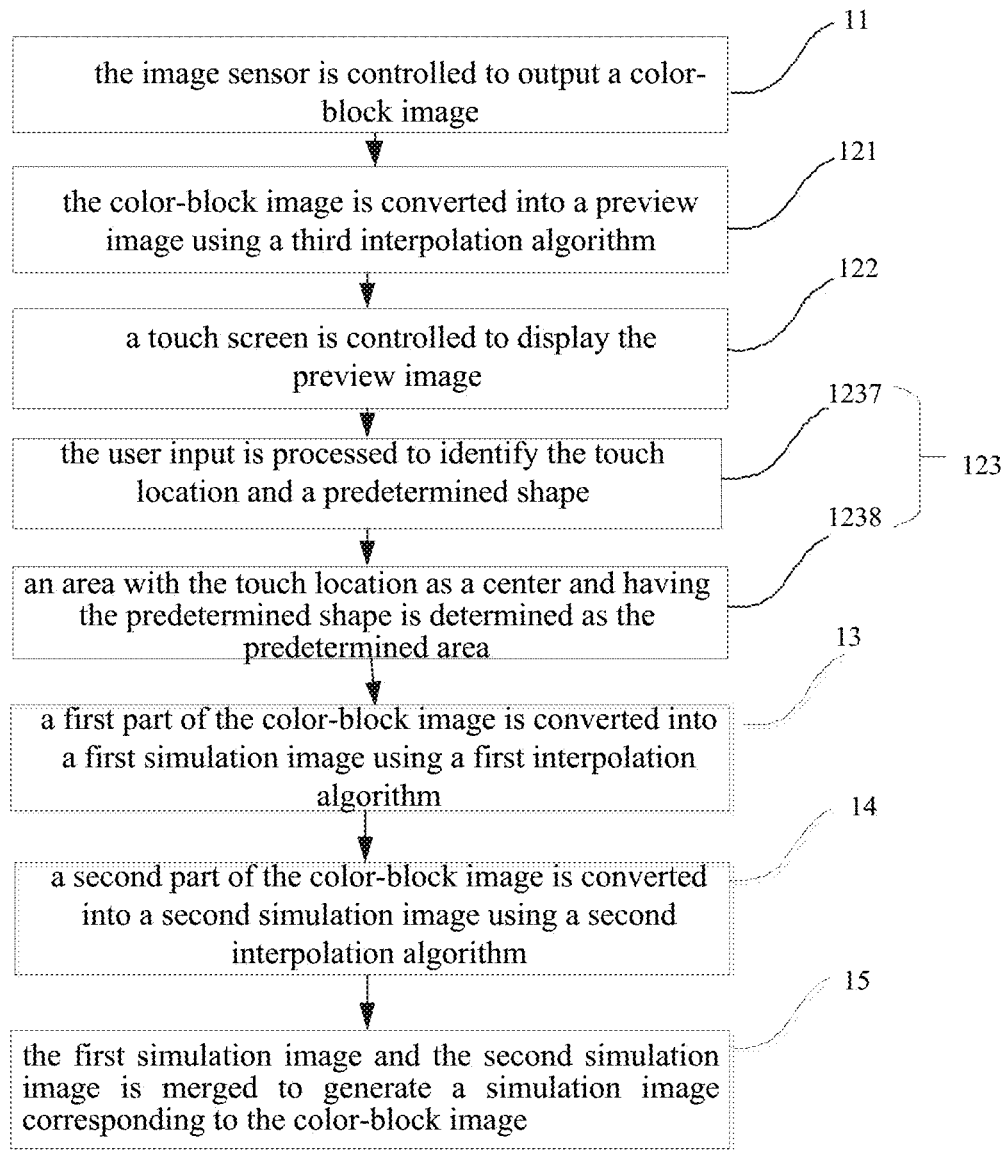
FIG. 16 is a flow chart of determining a predetermined area according to another embodiment of the present disclosure.

Referring to FIG. 16, in some embodiments, the act at block 123 includes the followings.

At block 1237, the user input is processed to identify the touch location and a predetermined shape.

At block 1238, an area with the touch location as a center and having the predetermined shape is determined as the predetermined area.

Figure 17:
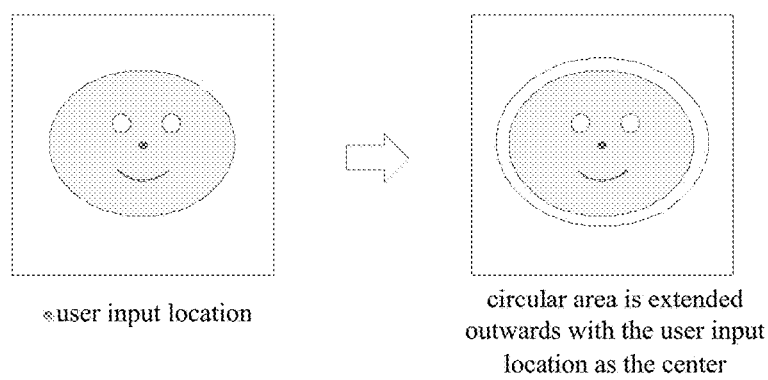
FIG. 17 is a schematic diagram of determining a predetermined area according to another embodiment of the preset disclosure.

In detail, referring to FIG. 17, the touch location of the user is represented by the black dot, and a circular area is extended outwards with the touch location as the center to generate the predetermined area. The predetermined area extending in a circular shape includes the entire face area, and the face area can be processed using the first interpolation algorithm to improve the resolution of the face area.

It should be noted that, in other embodiments, the extended predetermined shape may also be a rectangle, square or other shapes, and the user can adjust and drag the extended predetermined shape according to actual needs. In addition, the manner that the user specifies the predetermined area may also include that the user directly draw an arbitrary shape on the touch screen as the predetermined area, or the user selects several points on the touch screen, such that the area enclosed by the points are determined as the predetermined area. The part of image in the predetermined area is processed using the first interpolation algorithm. Therefore, the resolution of the main part of the image can be improved, and the user experience is improved.

Figure 18:
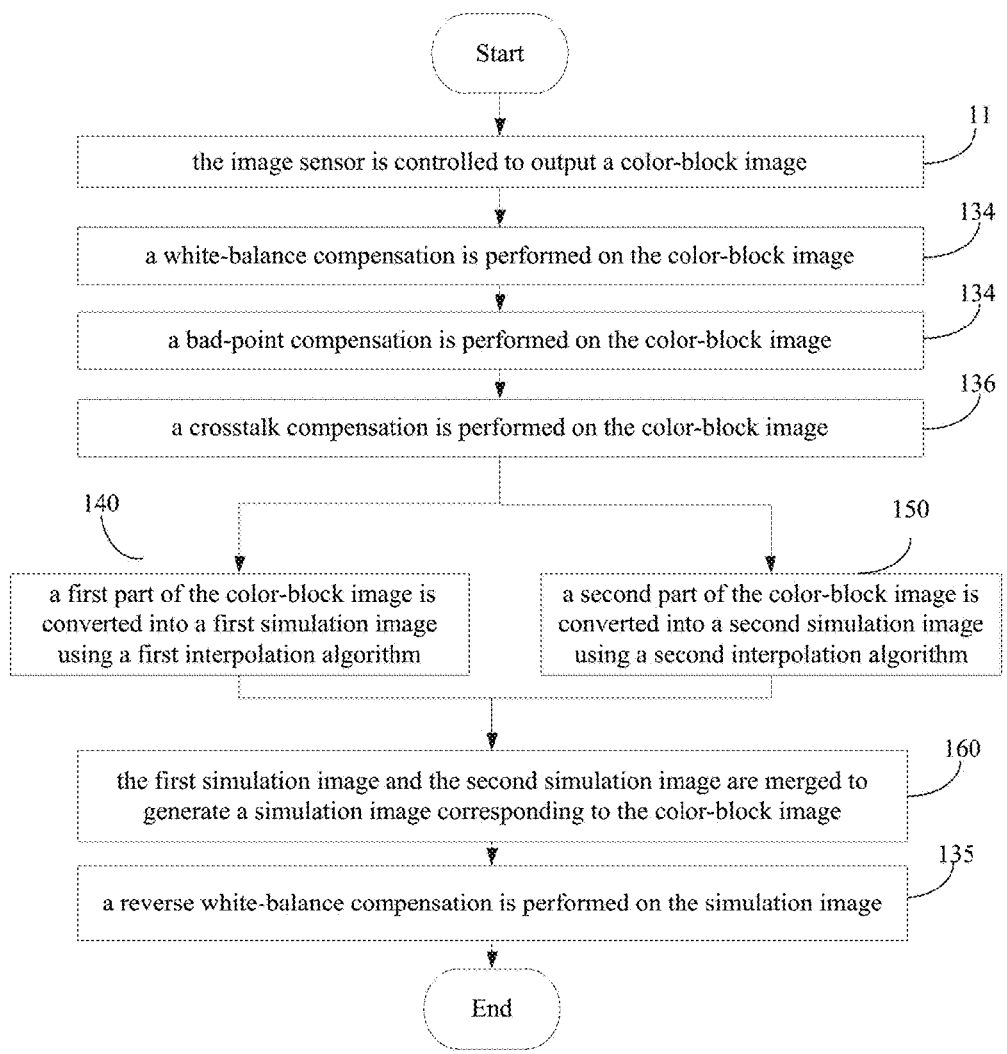
FIG. 18 is a flow chart of an image processing method according to an embodiment of the present disclosure.

Referring to FIG. 18, in some embodiments, before converting the color-block image into the first simulation image, the method further includes performing a white-balance compensation on the color-block image, as illustrated at block 134.

Accordingly, after converting the color-block image into the simulation image, the method further includes performing a reverse white-balance compensation on the simulation image, as illustrated at block 135.

In detail, in some examples, when converting the color-block image into the simulation image, during the interpolation, the red and blue simulation pixels not only refer to the color weights of original pixels having the same color as the simulation pixels, but also refer to the color weights of original pixels with the green color. Thus, it is required to perform the white-balance compensation before the interpolation to exclude an effect of the white-balance in the interpolation calculation. In order to avoid the white-balance of the color-block image, it is required to perform the reverse white-balance compensation after the interpolation according to gain values of the red, green and blue colors in the compensation.

In this way, the effect of the white-balance in the interpolation calculation can be excluded, and the simulation image obtained after the interpolation can keep the white-balance of the color-block image.

Referring to FIG. 18 again, in some implementations, before converting the color-block image into the simulation image, the method further includes performing a bad-point compensation on the color-block image, as illustrated at block 136.

It can be understood that, limited by the manufacturing process, there may be bad points in the image sensor 21. The bad point presents a same color all the time without varying with the photosensibility, which affects quality of the image. In order to ensure an accuracy of the interpolation and prevent from the effect of the bad points, it is required to perform the bad-point compensation before the interpolation.

In detail, during the bad-point compensation, the original pixels are detected. When an original pixel is detected as the bad point, the bad-point compensation is performed according to pixel values of other original pixels in the image pixel unit where the original pixel is located.

In this way, the effect of the bad point on the interpolation can be avoided, thus improving the quality of the image.

Referring to FIG. 18 again, in some implementations, before converting the color-block image into the simulation image, the method further includes performing a crosstalk compensation on the color-block image, as illustrated at block 137.

In detail, four photosensitive pixels in one photosensitive pixel unit are covered by the filters with the same color, and the photosensitive pixels have differences in photosensibility, such that fixed spectrum noise may occur in pure-color areas in the simulation true-color image outputted after converting the low brightness image, and the quality of the image may be affected. Therefore, it is required to perform the crosstalk compensation on the color-block image.

Figure 19:
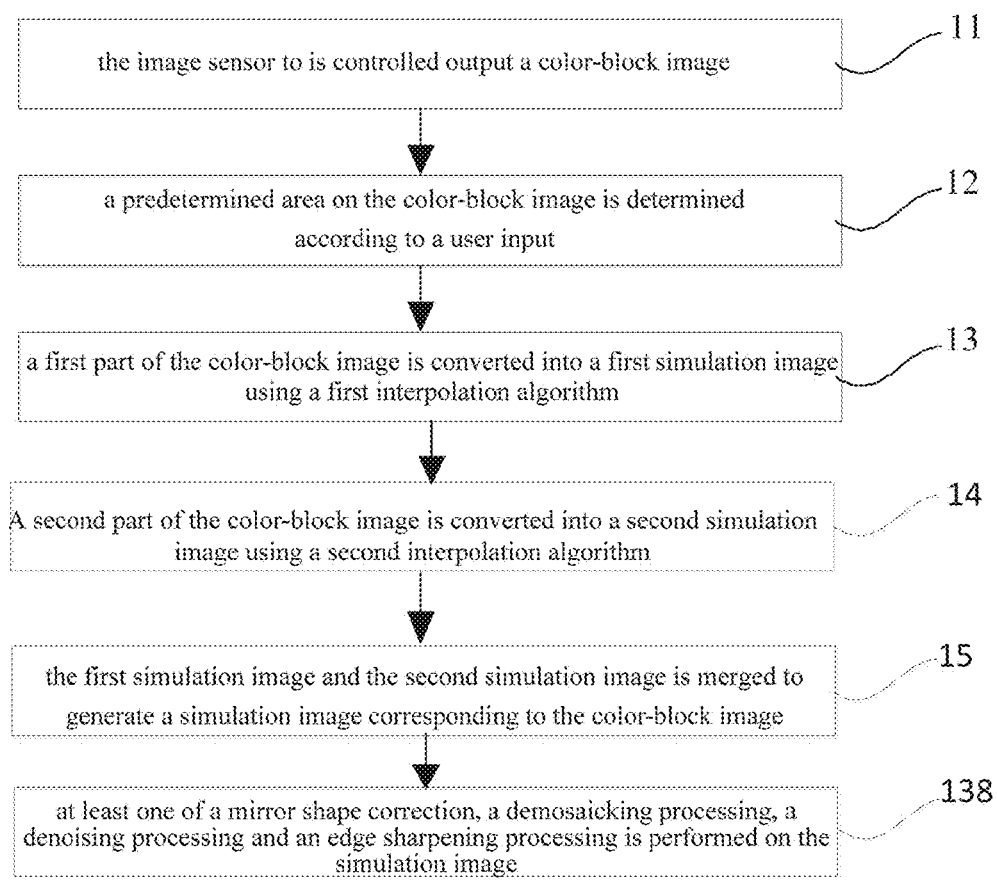
FIG. 19 is a flow chart of an image processing method according to an embodiment of the present disclosure.

Referring to FIG. 19, in some embodiments, after converting the color-block image into the simulation image, the method further includes performing at least one of a mirror shape correction, a demosaicking processing, a denoising processing and an edge sharpening processing on the simulation image, as illustrated at block 138.

It can be understood that, after the color-block image is converted into the simulation image, the simulation pixels are arranged in the typical Bayer array. The simulation image can be processed, during which, the mirror shape correction, the demosaicking processing, the denoising processing and the edge sharpening processing are included, such that the simulation true-color image can be obtained and output to the user.

With the image processing method according to embodiments of the present disclosure, the part of image in the predetermined area and the part of image outside the predetermined area are processed using different interpolation algorithms. The predetermined area can be selected by the user, and there are multiple selection ways to select the predetermined area.

In another aspect, the present disclosure also provides an image processing apparatus.

Figure 20:
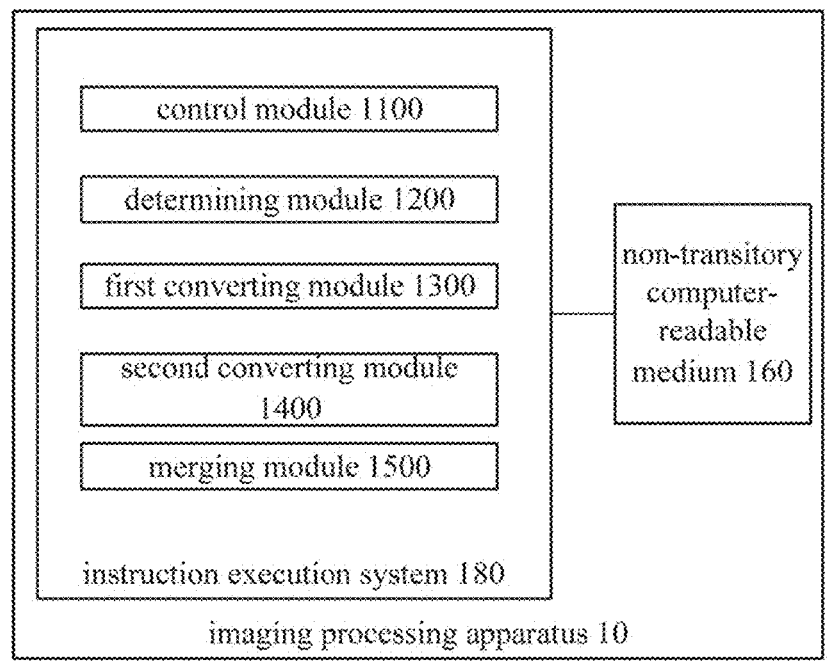
FIG. 20 is a block diagram of an image processing apparatus according to an embodiment of the present disclosure.

FIG. 20 is a block diagram of an image processing apparatus according to an embodiment of the present disclosure. Referring to FIG. 20, an image processing apparatus 10 is illustrated. The image processing apparatus 10 is applied in an electronic device. The electronic device includes an imaging apparatus including an image sensor 21. As illustrated above, the image sensor 21 includes an array 212 of photosensitive pixel units and an array 211 of filter units arranged on the array 212 of photosensitive pixel units. Each filter unit 211a corresponds to one photosensitive pixel unit 212a, and each photosensitive pixel unit 212a includes a plurality of photosensitive pixels 2121. The image processing apparatus 10 includes a non-transitory computer-readable medium 160 and an instruction execution system 180. The non-transitory computer-readable medium 160 includes computer-executable instructions stored thereon. The instruction execution system 180 is configured by the instructions stored in the medium 160 to perform at least one of a control module 1100, a determining module 1200, a first converting module 1300, a second converting module 1400 and a merging module 1500. The instruction execution system 180 is configured by the instructions stored in the medium 160 to implement the program modules.

The control module 1100 is configured to control the image sensor to output a color-block image. The color-block image includes image pixel units arranged in a preset array. Each image pixel unit includes a plurality of original pixels, each photosensitive pixel unit corresponds to one image pixel unit, and each photosensitive pixel corresponds to one original pixel.

The determining module 1200 is configured to determine a predetermined area on the color-block image according to a user input.

The first converting module 1300 is configured to convert a first part of the color-block image into a first simulation image using a first interpolation algorithm. The first part of the color-block image is in the predetermined area. The first simulation image includes first simulation pixels arranged in a preset array, and each photosensitive pixel corresponds to one first simulation pixel.

The second converting module 1400 is configured to convert a second part of the color-block image into a second simulation image using a second interpolation algorithm. The second part of the color-block image is outside the predetermined area. A complexity of the second interpolation algorithm is less than that of the first interpolation algorithm. The second simulation image includes second simulation pixels arranged in a preset array, and each photosensitive pixel corresponds to one second simulation pixel.

The merging module 1500 is configured to merge the first simulation image and the second simulation image to generate a simulation image corresponding to the color-block image.

Figure 21:
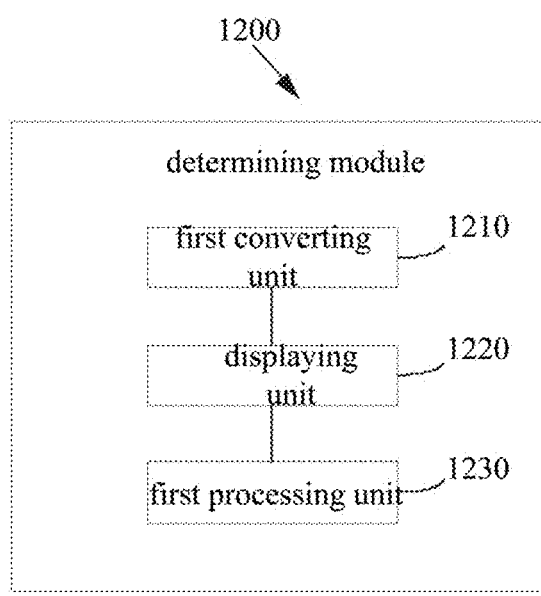
FIG. 21 is a block diagram of a determining module according to an embodiment of the present disclosure.

Referring to FIG. 21, in some embodiments, the determining module 1200 includes a first converting unit 1210, a displaying unit 1220, and a first processing unit 1230. The first converting unit 1210 is configured to convert the color-block image into a preview image using a third interpolation algorithm. The displaying unit 1220 is configured to control the touch screen to display the preview image. The first processing unit 1230 is configured to receive and process the user input on the touch screen to determine the predetermined area.

In other words, the act at block 121 can be implemented by the first converting unit 1210. The act at block 122 can be implemented by the displaying unit 1220. The act at block 123 can be implemented by the first processing module 1230.

Figure 22:
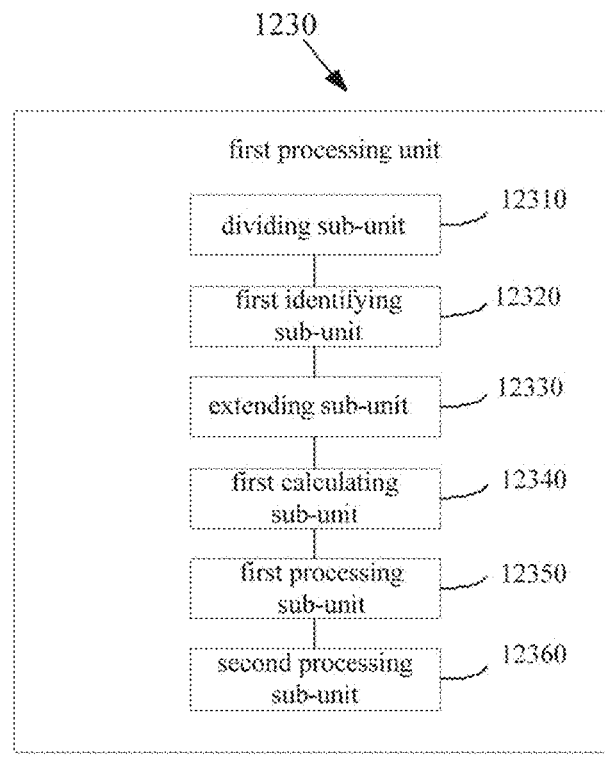
FIG. 22 is a block diagram of a first processing unit according to an embodiment of the present disclosure.

Referring to FIG. 22, in some embodiments, the first processing unit 1230 includes a dividing sub-unit 12310, a first identifying sub-unit 12320, an extending sub-unit 12330, a first calculating sub-unit 12340, a first processing sub-unit 12350 and a second processing sub-unit 12360. The dividing sub-unit 12310 is configured to divide the preview image into extension units arranged in an array. The first identifying sub-unit 12320 is configured to process the user input to identify a touch location. The extending sub-unit 12330 is configured to determine the extension unit where the touch location is located as an original extension unit, and to extend outwards by taking the original extension unit as a center. The first calculating sub-unit 12340 is configured to calculate a contrast value of each extension unit which the extending reaches. The first processing sub-unit 12350 is configured to determine the extension unit as an edge extension unit when the contrast value of the extension unit exceeds a preset threshold. The second processing sub-unit 12360 is configured to determine an area enclosed by the edge extension units as the predetermined area.

In other words, the act at block 1231 can be implemented by the dividing sub-unit 12310. The act at block 1232 can be implemented by the first identifying sub-unit 12320. The act at block 1233 can be implemented by the extending sub-unit 12330. The act at block 1234 can be implemented by the first calculating sub-unit 12340. The act at block 1235 can be implemented by the first processing sub-unit 12350. The act at block 1236 can be implemented by the second processing sub-unit 12360.

Figure 23:
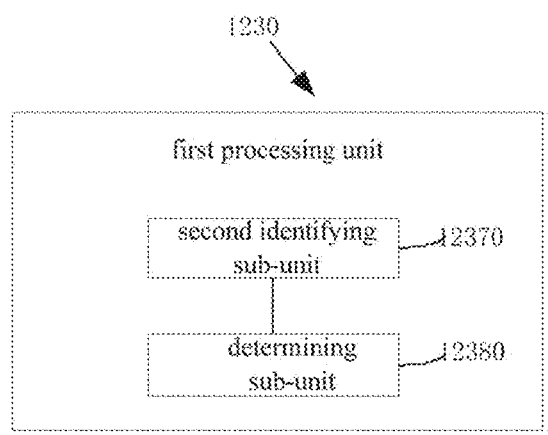
FIG. 23 is a block diagram of a first processing unit according to another embodiment of the present disclosure.

Referring to FIG. 23, in some embodiments, the first processing unit 123 includes a second identifying sub-unit 12370 and a determining sub-unit 12380. The second identifying sub-unit 12370 is configured to process the user input to identify the touch location and a predetermined shape. The determining sub-unit 12380 is configured to determine an area with the touch location as a center and having the predetermined shape as the predetermined area.

In other words, the act at block 1237 can be implemented by the second identifying sub-unit 1237. The act at block 1238 can be implemented by the determining sub-unit 12380.

Figure 24:
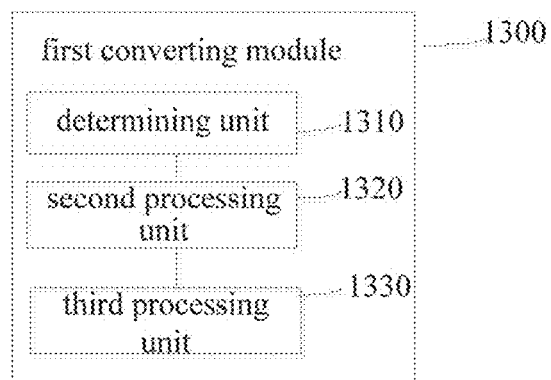
FIG. 24 is a block diagram of a first converting module according to another embodiment of the present disclosure.

Referring to FIG. 24, in some embodiments, the first converting module 1300 includes a determining unit 1310, a second processing unit 1320 and a third processing unit 1330. The determining unit 1310 is configured to determine whether a color of a first simulation pixel is identical to that of an original pixel at a same location as the first simulation pixel. The second processing unit 1320 is configured to determine a pixel value of the original pixel as a pixel value of the first simulation pixel when the color of the first simulation pixel is identical to that of the original pixel at the same location as the first simulation pixel. The third processing unit 1330 is configured to determine the pixel value of the first simulation pixel according to a pixel value of an association pixel when the color of the first simulation pixel is different from that of the original pixel at the same location as the first simulation pixel. The association pixel is selected from an image pixel unit with a same color as the simulation pixel and adjacent to an image pixel unit comprising the original pixel.

Figure 25:
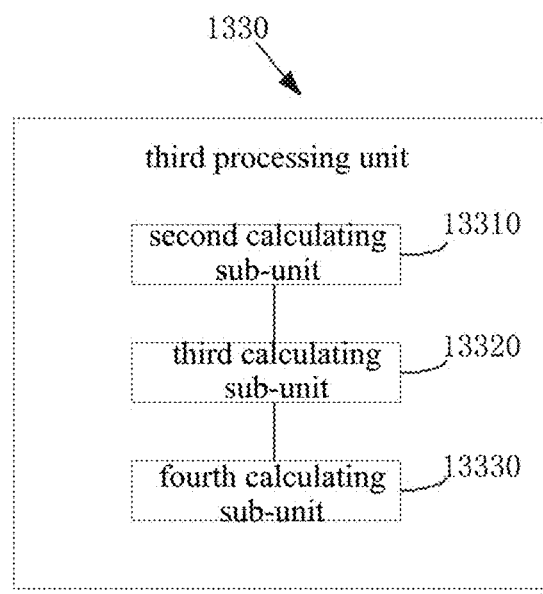
FIG. 25 is a block diagram of a third processing unit according to another embodiment of the present disclosure.

Referring to FIG. 25, in some embodiments, the third processing unit 1330 includes a second calculating sub-unit 13310, a third calculating sub-unit 13320 and a fourth calculating sub-unit 13330. The second calculating sub-unit 13310 is configured to calculate a change of the color of the first simulation pixel in each direction of at least two directions according to the pixel value of the association pixel. The third calculating sub-unit 13320 is configured to calculate a weight in each direction of the at least two directions according to the change. The fourth calculating sub-unit 13330 is configured to calculate the pixel value of the first simulation pixel according to the weight and the pixel value of the association pixel.

In other words, the act at block 1331 can be implemented by the second calculating sub-unit 13310. The act at block 1332 can be implemented by the third calculating sub-unit 13320. The act at block 1333 can be implemented by the fourth calculating sub-unit 13330.

Figure 26:
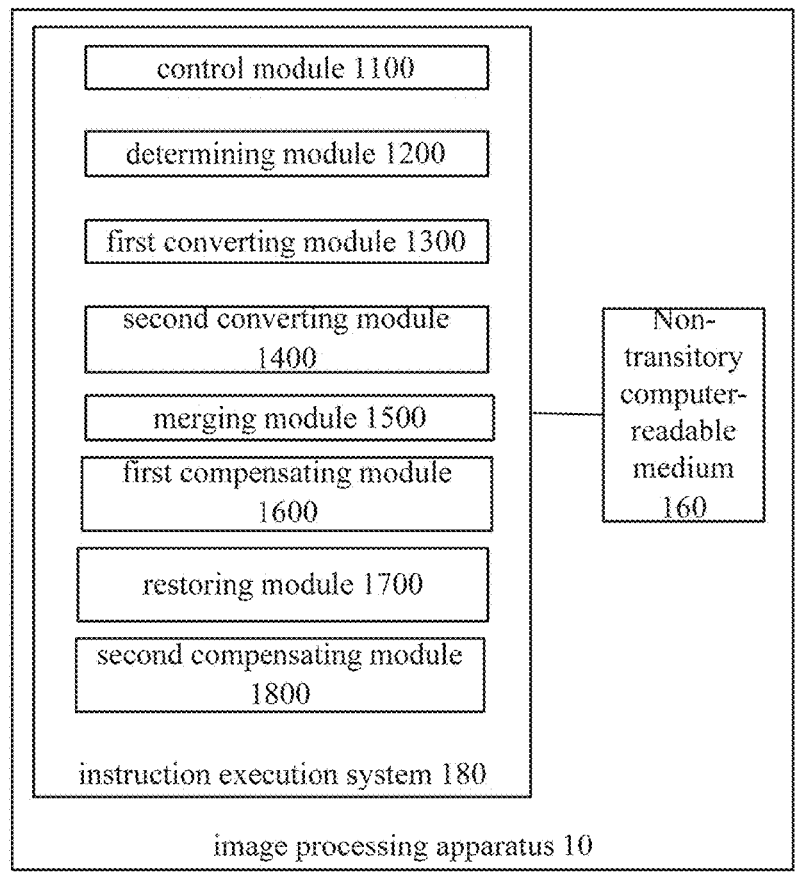
FIG. 26 is a block diagram of an image processing apparatus according to another embodiment of the present disclosure.

Referring to FIG. 26, in some embodiments, the image processing apparatus 10 further includes a first compensating module 1600 and a restoring module 1700. The first compensating module 1600 is configured to perform a white-balance compensation on the color-block image. The restoring module 1700 is configured to perform a reverse white-balance compensation on the simulation image.

In other words, the act at block 134 can be implemented by the first compensating module 1600. The act at block 135 can be implemented by the restoring module 1700.

Referring to FIG. 26 again, in some embodiments, the image processing apparatus further includes a second compensating module 1800. The second compensating module 1800 is configured to perform at least one of a bad-point compensation and a crosstalk compensation on the color-block image. In other words, the act at block 136 is can be implemented by the second compensating module 1800.

Figure 27:
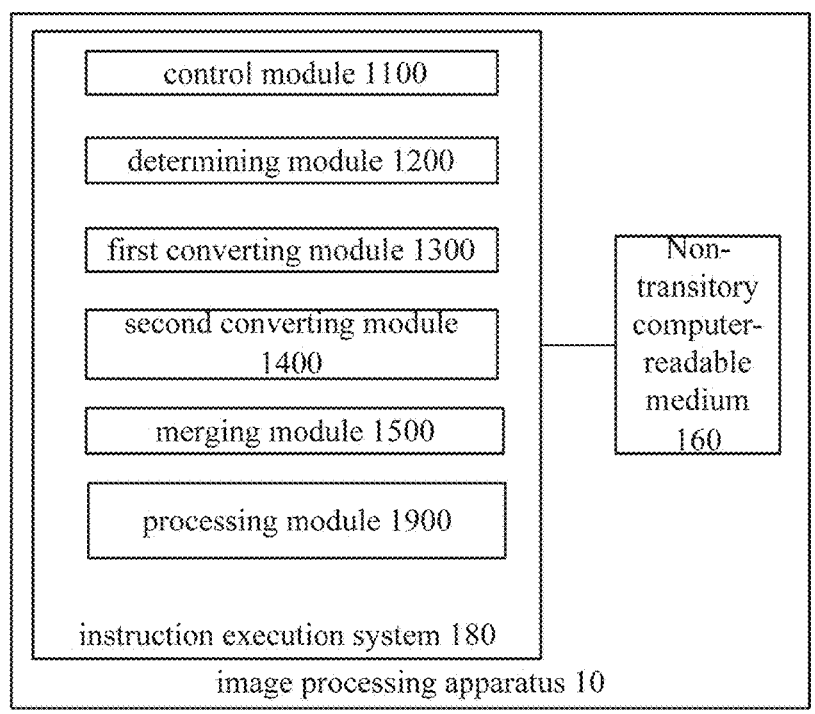
FIG. 27 is a block diagram of an image processing apparatus according to an embodiment of the present disclosure.

Referring to FIG. 27, in some embodiments, the image processing apparatus further includes a processing module 1900. The processing module 1900 is configured to perform at least one of a mirror shape correction, a demosaicking processing, a denoising processing and an edge sharpening processing on the simulation image. In other words, the act at block 137 can be implemented by the processing module 1900.

The present disclosure also provides an electronic device.

Figure 28:
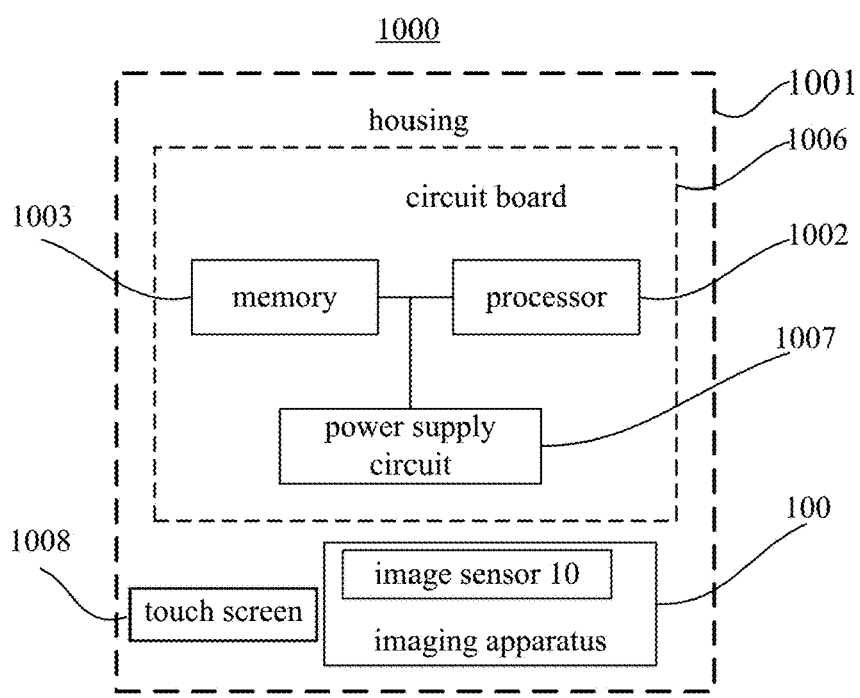
FIG. 28 is a block diagram of an electronic device according to an embodiment of the present disclosure.

FIG. 28 is a block diagram of an electronic device according to an embodiment of the present disclosure. Referring to FIG. 28, the electronic device 1000 of the present disclosure includes a housing 1001, a processor 1002, a memory 1003, a circuit board 1006, a power supply circuit 1007, an imaging apparatus 100 and a touch screen 1008. The circuit board 1006 is enclosed by the housing 1001. The processor 1002 and the memory 1003 are positioned on the circuit board 1006. The power supply circuit 1007 is configured to provide power for respective circuits or components of the electronic device 1000. The memory 1003 is configured to store executable program codes. The touch screen 1008 is configured to receive a user input.

The imaging apparatus 100 includes an image sensor 21. As illustrated above, the image sensor 21 includes an array 212 of photosensitive pixel units and an array 211 of filter units arranged on the array 212 of photosensitive pixel units. Each filter unit 211*a* corresponds to one photosensitive pixel unit 212*a*, and each photosensitive pixel unit 212*a* includes a plurality of photosensitive pixels 2121.

The processor 1002 is configured to run a program corresponding to the executable program codes by reading the executable program codes stored in the memory, to perform following operations: controlling the image sensor to output a color-block image, in which, the color-block image includes image pixel units arranged in a preset array, each image pixel unit includes a plurality of original pixels, each photosensitive pixel corresponds to one original pixel; determining a predetermined area on the color-block image according to the user input; converting a first part of the color-block image into a first simulation image using a first interpolation algorithm, in which, the first part of the color-block image is in the predetermined area, the first simulation image includes first simulation pixels arranged in a preset array, each photosensitive pixel corresponds to one first simulation pixel; converting a second part of the color-block image into a second simulation image using a second interpolation algorithm, in which, a complexity of the second interpolation algorithm is less than that of the first interpolation algorithm, the second part of the color-block image is outside the predetermined area, the second simulation image includes second simulation pixels arranged in a preset array, each photosensitive pixel corresponds to one second simulation pixel; and merging the first simulation image and the second simulation image to generate a simulation image corresponding to the color-block image.

In some implementations, the imaging apparatus includes a front camera or a real camera (not illustrated in FIG. 28).

In some implementations, the processor 1002 is configured to run a program corresponding to the executable program codes by reading the executable program codes stored in the memory, to perform determining a predetermined area on the color-block image according to a user input by acts of: converting the color-block image into a preview image using a third interpolation algorithm; controlling the touch screen to display the preview image; and receiving and processing the user input on the touch screen to determine the predetermined area.

In some implementations, the processor 1002 is configured to run a program corresponding to the executable program codes by reading the executable program codes stored in the memory, to perform receiving and processing the user input on the touch screen to determine the predetermined area by acts of: dividing the preview image into extension units arranged in an array; processing the user input to identify a touch location; determining the extension unit where the touch location is located as an original extension unit; calculating a contrast value of each extension unit which it reaches when extending outwards by taking the original extension unit as a center; determining the extension unit as an edge extension unit when the contrast value of the extension unit exceeds a preset threshold; and determining an area enclosed by the edge extension units as the predetermined area.

In some implementations, the processor 1002 is configured to run a program corresponding to the executable program codes by reading the executable program codes stored in the memory, to perform receiving and processing the user input on the touch screen to determine the predetermined area by acts of: processing the user input to identify the touch location and a predetermined shape; and determining an area with the touch location as a center and having the predetermined shape as the predetermined area.

In some implementations, the processor 1002 is configured to run a program corresponding to the executable program codes by reading the executable program codes stored in the memory, to perform converting the first part of the color-block image into a first simulation image using a first interpolation algorithm by acts of: determining whether a color of a first simulation pixel is identical to that of an original pixel at a same position as the first simulation pixel; when the color of the first simulation pixel is identical to that of the original pixel at the same position as the first simulation pixel, determining a pixel value of the original pixel as a pixel value of the first simulation pixel; and when the color of the first simulation pixel is different from that of the original pixel at the same position as the first simulation pixel, determining the pixel value of the first simulation pixel according to a pixel value of an association pixel, in which the association pixel is selected from an image pixel unit with a same color as the first simulation pixel and adjacent to an image pixel unit including the original pixel.

In some implementations, the processor 1002 is configured to run a program corresponding to the executable program codes by reading the executable program codes stored in the memory, to perform determining the pixel value of the first simulation pixel according to a pixel value of an association pixel by acts of: calculating a change of the color of the first simulation pixel in each direction of at least two directions according to the pixel value of the association pixel; calculating a weight in each direction of the at least two directions according to the change; and calculating the pixel value of the first simulation pixel according to the weight and the pixel value of the association pixel.

In some implementations, the processor 1002 is configured to run a program corresponding to the executable program codes by reading the executable program codes stored in the memory, to perform following operations: performing a white-balance compensation on the color-block image; and performing a reverse white-balance compensation on the simulation image.

In some implementations, the processor 1002 is configured to run a program corresponding to the executable program codes by reading the executable program codes stored in the memory, to perform following operations: performing at least one of a bad-point compensation and a crosstalk compensation on the color-block image.

In some implementations, the processor 1002 is configured to run a program corresponding to the executable program codes by reading the executable program codes stored in the memory, to perform following operations: performing at least one of a mirror shape correction, a demosaicking processing, a denoising processing and an edge sharpening processing on the simulation image.

In some implementations, the electronic device may be a mobile phone or a tablet computer, which is not limited herein.

The electronic device 1000 may further include an inputting component (not illustrated in FIG. 28). It should be understood that, the inputting component may further include one or more of the followings: an inputting interface, a physical button of the electronic device 1000, a microphone, etc.

It should be understood that, the electronic device 1000 may further include one or more of the following components (not illustrated in FIG. 28): an audio component, an input/output (I/O) interface, a sensor component and a communication component. The audio component is configured to output and/or input audio signals, for example, the audio component includes a microphone. The I/O interface is configured to provide an interface between the processor 1002 and peripheral interface modules. The sensor component includes one or more sensors to provide status assessments of various aspects of the electronic device 1000. The communication component is configured to facilitate communication, wired or wirelessly, between the electronic device 1000 and other devices.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Various embodiments and examples are provided in the following description to implement different structures of the present disclosure. In order to simplify the present disclosure, certain elements and settings will be described. However, these elements and settings are only examples and are not intended to limit the present disclosure. In addition, reference numerals may be repeated in different examples in the disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. An image processing method, applied in an electronic device, wherein the electronic device comprises an imaging apparatus comprising an image sensor, the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels, the image processing method comprises:

controlling the image sensor to output a color-block image, wherein, the color-block image comprises image pixel units arranged in a preset array, each image pixel unit comprises a plurality of original pixels, and each photosensitive pixel corresponds to one original pixel;

determining a predetermined area on the color-block image according to a user input;

converting a first part of the color-block image into a first simulation image using a first interpolation algorithm, wherein, the first part of the color-block image is in the predetermined area, the first simulation image comprises first simulation pixels arranged in a preset array, and each photosensitive pixel corresponds to one first simulation pixel;

converting a second part of the color-block image into a second simulation image using a second interpolation algorithm, wherein, the second part of the color-block image is outside the predetermined area, the second simulation image comprises second simulation pixels arranged in a preset array, each photosensitive pixel corresponds to one second simulation pixel, and a complexity of the second interpolation algorithm is less than that of the first interpolation algorithm,; and merging the first simulation image and the second simulation image to generate a simulation image corresponding to the color-block image.

2. The image processing method according to claim 1, wherein the preset array comprises a Bayer array.

3. The image processing method according to claim 1, wherein the image pixel unit comprises original pixels arranged in a 2-by-2 array.

4. The image processing method according to claim 1, wherein the electronic device comprises a touch screen, determining a predetermined area on the color-block image according to a user input comprises:

converting the color-block image into a preview image using a third interpolation algorithm;

controlling the touch screen to display the preview image; and receiving and processing the user input on the touch screen to determine the predetermined area.

5. The image processing method according to claim 4, wherein, receiving and processing the user input on the touch screen to determine the predetermined area comprises:

dividing the preview image into extension units arranged in an array;

processing the user input to identify a touch location;

determining the extension unit where the touch location is as an original extension unit;

calculating a contrast value of each extension unit which it reaches when extending outwards by taking the original extension unit as a center;

determining the extension unit as an edge extension unit when the contrast value of the extension unit exceeds a preset threshold; and determining an area enclosed by the edge extension units as the predetermined area.

6. The image processing method according to claim 4, wherein, receiving and processing the user input on the touch screen to determine the predetermined area comprises:

processing the user input to identify a touch location and a predetermined shape; and determining an area with the touch location as a center and having the predetermined shape as the predetermined area.

7. The image processing method according to claim 4, wherein the third interpolation algorithm comprises the second interpolation algorithm.

8. The image processing method according to claim 1, wherein, converting the first part of the color-block image into a first simulation image using a first interpolation algorithm comprises:

determining whether a color of a first simulation pixel is identical to that of an original pixel at a same location as the first simulation pixel;

when the color of the first simulation pixel is identical to that of the original pixel at the same location as the first simulation pixel, determining a pixel value of the original pixel as a pixel value of the first simulation pixel; and when the color of the first simulation pixel is different from that of the original pixel at the same location as the first simulation pixel, determining the pixel value of the first simulation pixel according to a pixel value of an association pixel, wherein the association pixel is selected from an image pixel unit with a same color as the first simulation pixel and adjacent to an image pixel unit comprising the original pixel.

9. The image processing method according to claim 8, wherein, determining the pixel value of the first simulation pixel according to a pixel value of an association pixel comprises:
   calculating a change of the color of the first simulation pixel in each direction of at least two directions according to the pixel value of the association pixel;
   calculating a weight in each direction of the at least two directions according to the change; and
   calculating the pixel value of the first simulation pixel according to the weight and the pixel value of the association pixel.

10. The image processing method according to claim 1, further comprising:
    performing a white-balance compensation on the color-block image; and
    performing a reverse white-balance compensation on the simulation image.

11. The image processing method according to claim 1, further comprising:
    performing at least one of a bad-point compensation and a crosstalk compensation on the color-block image.

12. The image processing method according to claim 1, further comprising:
    performing at least one of a mirror shape correction, a demosaicking processing, a denoising processing and an edge sharpening processing on the simulation image.

13. An image processing apparatus, applied in an electronic device, wherein the electronic device comprises an imaging apparatus comprising an image sensor, the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels; the image processing apparatus comprises a non-transitory computer-readable medium comprising computer-executable instructions stored thereon, and an instruction execution system which is configured by the instructions to implement at least one of:
    a control module, configured to control the image sensor to output a color-block image, wherein, the color-block image comprises image pixel units arranged in a preset array, each image pixel unit comprises a plurality of original pixels, and each photosensitive pixel corresponds to one original pixel;
    a determining module, configured to determine a predetermined area on the color-block image according to a user input;
    a first converting module, configured to convert a first part of the color-block image into a first simulation image using a first interpolation algorithm, wherein, the first part of the color-block image is in the predetermined area, the first simulation image comprises first simulation pixels arranged in a preset array, and each photosensitive pixel corresponds to one first simulation pixel;
    a second converting module, configured to convert a second part of the color-block image into a second simulation image using a second interpolation algorithm, wherein, a complexity of the second interpolation algorithm is less than that of the first interpolation algorithm, the second part of the color-block image is outside the predetermined area, the second simulation image comprises second simulation pixels arranged in a preset array, and each photosensitive pixel corresponds to one second simulation pixel; and
    a merging module, configured to merge the first simulation image and the second simulation image to generate a simulation image corresponding to the color-block image.

14. The image processing apparatus according to claim 13, wherein the preset array comprises a Bayer array.

15. The image processing apparatus according to claim 13, wherein the image pixel unit comprises original pixels arranged in a 2-by-2 array.

16. The image processing apparatus according to claim 13, wherein the electronic device comprises a touch screen, and the determining module comprises:
    a first converting unit, configured to convert the color-block image into a preview image using a third interpolation algorithm;
    a displaying unit, configured to control the touch screen to display the preview image; and
    a first processing unit, configured to receive and process the user input on the touch screen to determine the predetermined area.

17. The image processing apparatus according claim 16, wherein the first processing unit comprises:
    a dividing sub-unit, configured to divide the preview image into extension units arranged in an array;
    a first identifying sub-unit, configured to process the user input to identify a touch location;
    an extending sub-unit, configured to determine the extension unit where the touch location is as an original extension unit, and to extend outwards by taking the original extension unit as a center;
    a first calculating sub-unit, configured to calculate a contrast value of each extension unit which the extending reaches;
    a first processing sub-unit, configured to determine an extension unit as an edge extension unit when the contrast value of the extension unit exceeds a preset threshold; and
    a second processing sub-unit, configured to determine an area enclosed by the edge extension units as the predetermined area.

18. The image processing apparatus according to claim 16, wherein the first processing unit comprises:
    a second identifying sub-unit, configured to process the user input to identify a touch location and a predetermined shape; and
    a determining sub-unit, configured to determine an area with the touch location as a center and having the predetermined shape as the predetermined area.

19. The image processing apparatus according to claim 16, wherein the third interpolation algorithm comprises the second interpolation algorithm.

20. The image processing apparatus according to claim 13, wherein the first converting module comprises:
    a determining unit, configured to determine whether a color of a first simulation pixel is identical to that of an original pixel at a same location as the first simulation pixel;
    a second processing unit, configured to determine a pixel value of the original pixel as a pixel value of the first simulation pixel when the color of the first simulation pixel is identical to that of the original pixel at the same location as the first simulation pixel; and
    a third processing unit, configured to determine the pixel value of the first simulation pixel according to a pixel value of an association pixel when the color of the simulation pixel is different from that of the original pixel at the same location as the first simulation pixel, wherein the association pixel is selected from an image pixel unit with a same color as the first simulation pixel and adjacent to an image pixel unit comprising the original pixel.

21. The image processing apparatus according to claim 20, wherein, the third processing unit comprises:
a second calculating sub-unit, configured to calculate a change of the color of the first simulation pixel in each direction of at least two directions according to the pixel value of the first association pixel;
a third calculating sub-unit, configured to calculate a weight in each direction of the at least two directions according to the change; and
a fourth calculating sub-unit, configured to calculate the pixel value of the first simulation pixel according to the weight and the pixel value of the association pixel.

22. The image processing apparatus according to claim 13, further comprising:
a first compensating module, configured to perform a white-balance compensation on the color-block image; and
a restoring module, configured to perform a reverse white-balance compensation on the simulation image.

23. The image processing apparatus according to claim 13, further comprising:
a second compensating module, configured to perform at least one of a bad-point compensation and a crosstalk compensation on the color-block image.

24. The image processing apparatus according to claim 13, further comprising:
a processing module, configured to perform at least one of a mirror shape correction, a demosaicking processing, a denoising processing and an edge sharpening processing on the simulation image.

25. An electronic device, comprising a housing, a processor, a memory, a circuit board, a power supply circuit, an imaging apparatus and a touch screen, wherein,
the circuit board is enclosed by the housing;
the processor and the memory are positioned on the circuit board;
the power supply circuit is configured to provide power for respective circuits or components of the electronic device;
the imaging apparatus comprises an image sensor, wherein the image sensor comprises an array of photosensitive pixel units and an array of filter units arranged on the array of photosensitive pixel units, each filter unit corresponds to one photosensitive pixel unit, and each photosensitive pixel unit comprises a plurality of photosensitive pixels;
the touch screen is configured to receive a user input;
the memory is configured to store executable program codes; and
the processor is configured to run a program corresponding to the executable program codes by reading the executable program codes stored in the memory, to perform following operations:
controlling the image sensor to output a color-block image, wherein, the color-block image comprises image pixel units arranged in a preset array, each image pixel unit comprises a plurality of original pixels of a same color, each photosensitive pixel corresponds to one original pixel;
determining a predetermined area on the color-block image according to the user input;
converting a first part of the color-block image into a first simulation image using a first interpolation algorithm, wherein, the first part of the color-block image is in the predetermined area, the first simulation image comprises first simulation pixels arranged in a preset array, and each photosensitive pixel corresponds to one first simulation pixel;
converting a second part of the color-block image into a second simulation image using a second interpolation algorithm, wherein, a complexity of the second interpolation algorithm is less than that of the first interpolation algorithm, the second part of the color-block image is outside the predetermined area, the second simulation image comprises second simulation pixels arranged in a preset array, each photosensitive pixel corresponds to one second simulation pixel; and
merging the first simulation image and the second simulation image to generate a simulation image corresponding to the color-block image.

26. The electronic device according to claim 25, wherein the imaging apparatus comprises a front camera or a rear camera.

* * * * *